US012700181B2

(12) United States Patent
Zhu et al.

(10) Patent No.: US 12,700,181 B2
(45) Date of Patent: Aug. 4, 2026

(54) 3D RECONSTRUCTION USING 3D TRIPLANE REPRESENTATION

(71) Applicant: QUALCOMM Incorporated, San Diego, CA (US)

(72) Inventors: Yinhao Zhu, La Jolla, CA (US); Rajeev Yasarla, San Diego, CA (US); Haiyan Wang, Mountain View, CA (US); Shizhong Steve Han, San Diego, CA (US); Yunxiao Shi, San Diego, CA (US); Hong Cai, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 18/590,868

(22) Filed: Feb. 28, 2024

(65) Prior Publication Data

US 2025/0272919 A1 Aug. 28, 2025

(51) Int. Cl.
*G06T 17/20* (2006.01)
*G06T 7/50* (2017.01)

(52) U.S. Cl.
CPC ............... *G06T 17/20* (2013.01); *G06T 7/50* (2017.01); *G06T 2207/10028* (2013.01); *G06T 2207/20081* (2013.01); *G06T 2207/20084* (2013.01); *G06T 2210/12* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 2010/0249589 A1* | 9/2010 | Lysyansky ............. | A61B 8/466 |
| | | | 600/440 |
| 2022/0092802 A1 | 3/2022 | Jang et al. | |
| 2024/0013477 A1* | 1/2024 | Xu .......................... | G06T 15/08 |
| 2024/0096017 A1* | 3/2024 | Gao ........................ | G06T 15/04 |
| 2024/0104842 A1* | 3/2024 | Nagano ..................... | G06T 7/70 |

(Continued)

OTHER PUBLICATIONS

Chan E.R., et al., "Efficient Geometry-aware 3D Generative Adversarial Networks", 2022 IEEE/CVF Conference on Computer Vision and Pattern Recognition (CVPR), Jun. 18-24, 2022, pp. 16123-16133.

(Continued)

*Primary Examiner* — Frank S Chen
(74) *Attorney, Agent, or Firm* — QUALCOMM Incorporated; Espartaco Diaz Hidalgo

(57) ABSTRACT

An apparatus for generation of a 3D representation of a scene includes a memory for storing a plurality of images depicting a scene; and processing circuitry in communication with the memory. The processing circuitry is configured to generate a depth map for the plurality of input images depicting a scene and unproject the depth map to a three-dimensional (3D) point cloud. The processing circuitry is also configured to project a plurality of 3D points from the 3D point cloud to a plurality of two dimensional (2D) planes and extract a plurality of triplane features from the plurality of 2D planes. The processing circuitry is further configured to generate a 3D representation of the scene based on combining the plurality of triplane features and a plurality of image features extracted from the plurality of input images.

30 Claims, 11 Drawing Sheets

100

(56) References Cited

U.S. PATENT DOCUMENTS

| | | | |
|---|---|---|---|
| 2024/0153201 A1* | 5/2024 | Ranjan | G06T 15/08 |
| 2024/0265621 A1* | 8/2024 | Xu | G06T 3/4046 |

OTHER PUBLICATIONS

Peng S., et al., "Convolutional Occupancy Networks", arXiv:2003.04618v2 [cs.CV] Aug. 1, 2020, pp. 1-17.

Stier N., et al., "FineRecon: Depth-aware Feed-forward Network for Detailed 3D Reconstruction", 2023 IEEE/CVF International Conference on Computer Vision (ICCV), Oct. 2023, pp. 18423-18432.

Wang T., et al., "Rodin: A Generative Model for Sculpting 3D Digital Avatars Using Diffusion", arXiv:2212.06135v1 [cs.CV] Dec. 12, 2022, 20 Pages.

Ye S., et al., "Indoor Scene Reconstruction with Fine-Grained Details Using Hybrid Representation and Normal Prior Enhancement", arXiv:2309.07640v2 [cs.CV] Dec. 25, 2023, pp. 1-14.

Gupta A., et al., "3DGen: Triplane Latent Diffusion for Textured Mesh Generation", arXiv:2303.05371v2 [cs.CV], Mar. 27, 2023, 10 Pages, XP093263179, abstract section 2; figure 1.

International Search Report and Written Opinion—PCT/US2025/017037—ISA/EPO—Jun. 6, 2025 15 Pages.

Wang P., et al., "PF-LRM: Pose-Free Large Reconstruction Model for Joint Pose and Shape Prediction", arXiv:2311.12024v2 [cs.CV], arXiv.org, Nov. 23, 2023, pp. 1-26, XP093280620, abstract section 3; figure 2.

* cited by examiner

3D RECONSTRUCTION USING 3D TRIPLANE REPRESENTATION

TECHNICAL FIELD

This disclosure relates to image processing.

BACKGROUND

Three-dimensional (3D) reconstruction is the process of creating a three-dimensional model of an object or scene from two-dimensional images or other data sources. 3D reconstruction is a fundamental task in computer vision and has many important applications in XR (extended reality), robotics, and autonomous driving. XR is a broad term that encompasses virtual reality (VR), augmented reality (AR), and mixed reality (MR). All of these technologies require accurate 3D models of the real world in order to create immersive and believable experiences. For example, VR headsets use 3D models to render virtual worlds that users can explore. AR and MR applications use 3D models to overlay digital information onto the real world.

Robots need to be able to understand the 3D world around them in order to navigate and interact with objects. 3D reconstruction is used to create 3D maps of environments and to track objects in real time. For example, robotic vacuum cleaners use 3D maps to navigate around homes and avoid obstacles. Self-driving cars use 3D reconstruction to track the positions of other vehicles and pedestrians.

SUMMARY

In general, this disclosure describes techniques for efficient high-resolution 3D reconstruction. Autonomous vehicles need to be able to perceive the 3D world around them in order to navigate safely. 3D reconstruction may be used to create 3D maps of roads and to track the positions of other vehicles and pedestrians. For example, self-driving vehicles may use 3D maps to identify lanes and traffic signs. The self-driving vehicles may also use 3D reconstruction to track the positions of other vehicles and pedestrians in order to avoid collisions. In addition to the applications mentioned above, 3D reconstruction may also be used in many other fields, such as, but not limited to, architecture, archaeology, and medicine. For example, 3D reconstruction may be used to create digital models of historical buildings and artifacts. 3D reconstruction may also be used to create 3D models of medical images, such as Magnetic Resonance Imaging (MRI) and Computed Tomography (CT) scans, which may help doctors to diagnose diseases and plan treatments.

In an aspect, the disclosed machine learning system may leverage 3D triplane representation technique. 3D triplane representation is a technique for representing a 3D volume as three two-dimensional (2D) feature planes. 3D triplane representation may be implemented by projecting the 3D volume onto each of the three orthogonal planes: XY, XZ, and YZ. The machine learning system may then process the resulting 2D feature planes in a manner more efficient and expressive than 3D convolutions. SDF (signed distance function) and TSDF (truncated signed distance function) are two ways of representing the distance from a point to the nearest surface in a 3D volume. Occupancy values may represent the probability that a point in a 3D volume is occupied by an object. In an aspect, the machine learning system may convert 3D triplane features to SDF/TSDF or occupancy values. Once the machine learning system obtains the SDF/TSDF or occupancy values for at least a subset of all points in the 3D volume, the machine learning system may convert them to a 3D mesh. Advantageously, the disclosed 3D triplane representation techniques may lead to significant speedups because 2D convolutions are more efficient than 3D convolutions. As yet another non-limiting advantage, the disclosed techniques using 2D feature maps processed by 2D convolution enable higher resolution feature maps, which could achieve higher spatial resolution for the reconstruction.

In one example, an apparatus for generation of a 3D representation of a scene includes a memory for storing a plurality of images depicting a scene; and processing circuitry in communication with the memory. The processing circuitry is configured to generate a depth map for the plurality of input images depicting a scene and unproject the depth map to a three-dimensional (3D) point cloud. The processing circuitry is also configured to project a plurality of 3D points from the 3D point cloud to a plurality of two dimensional (2D) planes and extract a plurality of triplane features from the plurality of 2D planes. The processing circuitry is further configured to generate a 3D representation of the scene based on combining the plurality of triplane features and a plurality of image features extracted from the plurality of input images.

In another example, a method includes generating a depth map for the plurality of input images depicting a scene and unprojecting the depth map to a three-dimensional (3D) point cloud. The method also includes projecting a plurality of 3D points from the 3D point cloud to a plurality of two dimensional (2D) planes and extracting a plurality of triplane features from the plurality of 2D planes. The method further includes generating a 3D representation of the scene based on combining the plurality of triplane features and a plurality of image features extracted from the plurality of input images.

In yet another example, a computer-readable medium includes instructions that, when applied by processing circuitry, cause the processing circuitry to: generate a depth map for the plurality of input images depicting a scene and unproject the depth map to a three-dimensional (3D) point cloud. Additionally, the instructions cause the processing circuitry to project a plurality of 3D points from the 3D point cloud to a plurality of two dimensional (2D) planes and extract a plurality of triplane features from the plurality of 2D planes. The instructions further cause the processing circuitry to generate a 3D representation of the scene based on combining the plurality of triplane features and a plurality of image features extracted from the plurality of input images.

The details of one or more examples are set forth in the accompanying drawings and the description below. Other features, objects, and advantages will be apparent from the description, drawings, and claims.

DETAILED DESCRIPTION

FineRecon is an example of a state-of-the-art 3D reconstruction system that uses 2D image features to integrate into a 3D volume. The FineRecon system implements 3D reconstruction by using the camera poses of the images and the camera parameters. The FineRecon system then concatenates the depth volume and feature volume (along the channel dimension) and processes the concatenated information by a 3D convolutional neural network (CNN). The FineRecon system is able to produce high-quality 3D reconstructions, but the FineRecon system is also very memory intensive and computationally expensive because the FineRecon system needs to process 3D volumes, which are much larger than 2D images. Additionally, the 3D CNN needs to have a large number of parameters in order to learn the complex features required for 3D reconstruction.

In an aspect, the disclosed techniques leverage points and triplane representation for 3D reconstruction. In some examples, the techniques use points and three orthogonal 2D planes to represent a 3D volume. The example techniques may provide a number of advantages over traditional 3D reconstruction methods, including, but not limited to, efficiency, accuracy and robustness. Point-based 3D reconstruction represents an object as a collection of discrete points in 3D space. These points capture the surface geometry of the object, and their density may be adjusted to balance accuracy and memory usage. Voxel-based 3D reconstruction represents an object by dividing the surrounding space into a 3D grid of voxels, which are small cubic cells. Each voxel may be assigned a value indicating whether it is occupied by the object or not. Point-based 3D reconstruction is more efficient than voxel-based 3D reconstruction because the point-based 3D reconstruction only needs to store and process the points that make up the object.

Triplane representation is a surface-based representation of a 3D object. The object may be represented by a set of three 2D feature maps, one for each axis. The triplanes are aligned with the three axes of the 3D object. Each pixel in a triplane may represent a point on the surface of the object. Triplane representation may capture more accurate geometric information than traditional 3D representation methods, such as voxels. In an aspect, the machine learning system may first collect point data from the object or scene that needs to be reconstructed. Such collection may be implemented using a variety of sensors, such as, but not limited to, video cameras. Next, the machine learning system may project the point data onto the three orthogonal planes: XY, XZ, and YZ to create three 2D feature planes. In an aspect, the machine learning system may process the three 2D feature planes with separate 2D CNNs to extract features from each plane. Finally, the machine learning system may combine the features from the three planes and image features to form a single 3D representation.

Figure 1:
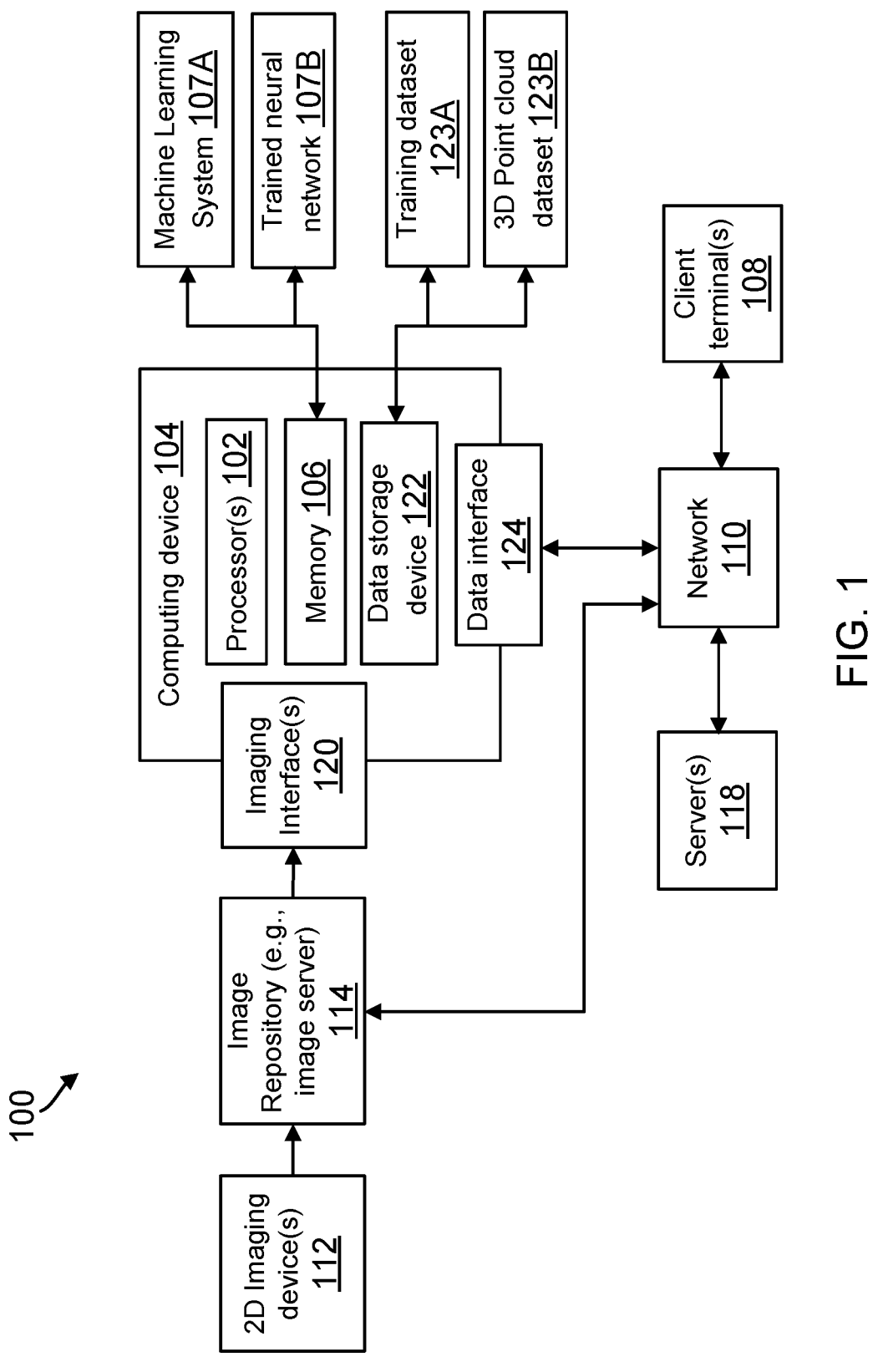
FIG. 1 is a block diagram of components of a system for 3D reconstruction of a scene from a plurality of 2D images depicting the scene, in accordance with the techniques of this disclosure.

FIG. 1 is a block diagram of components of a system for reconstruction of a 3D scene from one or more 2D images depicting the scene. System 100 may implement the method described with reference to FIG. 6, optionally by a hardware processor(s) 102 of a computing device 104 executing code instructions stored in a memory 106. An exemplary implementation of 3D reconstruction of a target scene based on a plurality of 2D images is now described to help understand system 100. A plurality of 2D imaging devices 112 (e.g., monocular video camera) may acquire a plurality of 2D image(s) of a target scene. The 2D images may be stored in an image repository 114, for example, but not limited to, a cloud storage and/or a storage server. Computing device 104 may generate the 3D point cloud from the plurality of 2D images by executing the trained machine learning system 107A which may utilize a plurality of trained neural networks 107B, as described herein. The trained neural network 107B may be generated from a training dataset 123A of templates created from 2D images, as described more fully below. The generated 3D point cloud may be stored in a 3D point cloud dataset 123B.

Computing device 104 may be implemented as, for example, a client terminal, a server, a virtual server, a virtual machine, a computing cloud, a mobile device, a desktop computer, a thin client, a Smartphone, a Tablet computer, a laptop computer, a wearable computer, glasses computer, and a watch computer. Computing device 104 may include one or more devices for enabling the user to view the 3D mesh of the scene that is generated using the 3D triplane representation framework shown in FIG. 3, for example.

Computing device 104 may include locally stored software that performs one or more of the methods described with reference to FIG. 6, and/or may act as one or more servers (e.g., network server, web server, a computing cloud, virtual server) that provides services (e.g., one or more of the steps described with reference to FIG. 6) to one or more client terminals 108 (e.g., client terminal used by a user for viewing images, client terminal running a machine learning system(s) 107A for generating a 3D representation of a target scene, client terminal running computer aided diagnosis (CAD) application(s) for automated analysis of the 3D mesh of the target scene) over a network 110, for example, providing software as a service (SaaS) to the client terminal(s) 108, providing an application for local download to the client terminal(s) 108, as an add-on to a web browser and/or a 3D image reconstruction application, and/or providing functions using a remote access session to the client terminals 108, such as through a web browser, application programming interface (API), and/or software development kit (SDK), for example, for integrating 3D image reconstruction applications with the computing device 104 to enable the 3D image reconstruction application to obtain the generated 3D mesh of the scene that the 3D image reconstruction application is designed for. Client terminal(s) 108 may be implemented as, for example, a desktop computer (e.g., running a CAD application and/or 3D image reconstruction applications) and a mobile device (e.g., laptop, smartphone, glasses, wearable device).

It is noted that the training of the machine learning system 107A having one or more neural network(s) 107B, and the application of the trained machine learning system 107A to a plurality of 2D images depicting a target scene, may be implemented by the same computing device 104, and/or by different computing devices 104, for example, one computing device 104 may train the machine learning system 107A, and may transmit the trained machine learning system 107A to another server device 104 which may use the trained machine learning system 107A to perform 3D reconstruction of 2D images. Computing device 104 may receive 2D images captured by 2D imaging device(s) 112 (e.g., monocular video camera) for generation of 3D mesh. 2D images may be stored in an image repository 114, for example, a storage server, a computing cloud, virtual memory, and a hard disk. Training dataset 123A may be created from the captured 2D images as described herein.

Computing device 104 may receive the 2D images from imaging device(s) 112 and/or image repository 114 using one or more imaging interface(s) 120, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)). Hardware processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 (also referred to herein as data storage device) may store code instruction for execution by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). For example, memory 106 may store code that implements one or more steps and/or features of the method described with reference to FIG. 6.

Computing device 104 may include a data storage device 122 for storing data, for example, training dataset 123A (created as described herein), 3D point cloud dataset 123B (e.g., that stores the generated 3D point clouds), and/or machine learning system 107A. Data storage device 122 may be implemented as, for example, a memory, a local hard-drive, a removable storage device, an optical disk, a storage device, and/or as a remote server and/or computing cloud (e.g., accessed over network 110).

Computing device 104 may include data interface 124, optionally a network interface, for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may access one or more remote servers 118 using network 110, for example, to download updated training datasets, to download components for inclusion in the training datasets (e.g., 2D images) and/or to download an updated version of the machine learning system 107A and/or one or more trained neural networks 107B. It is noted that imaging interface 120 and data interface 124 may be implemented as a single interface (e.g., network interface, single software interface), and/or as two independent interfaces such as software interfaces (e.g., as APIs, network ports) and/or hardware interfaces (e.g., two network interfaces), and/or combination (e.g., single network interface, and two software interfaces, two virtual interfaces on a common physical interface, virtual networks on a common network port). The term/component imaging interface 120 may sometimes be interchanged with the term data interface 124.

Computing device 104 may communicate using network 110 (or another communication channel, such as through a direct link (e.g., cable, wireless) and/or indirect link (e.g., via an intermediary computing device such as a server, and/or via a storage device) with one or more of:

Client terminal(s) 108, for example, when computing device 104 acts as a server that performs a 3D reconstruction from provided 2D images. Client terminal 108 may provide the 2D images and receive the 3D reconstruction generated by computing device 104. The obtained 3D reconstruction (e.g., 3D mesh) may be, for example, presented within a viewing application for viewing on a display of the client terminal 108.

Server 118, such as where server 118 may be implemented as image server 114. Server 118 may store new 2D images as they are captured. In another implementation, server 118 may be in communication with image server 114 and computing device 104. Server 118 may coordinate between image server 114 and computing device 104, for example, transmitting newly received 2D images from server 118 to computing device 104 for performing 3D reconstruction of the 2D images.

Image repository 114 that stores 2D images and/or imaging device 112 that outputs the 2D images and/or 3D mesh.

Figure 2:
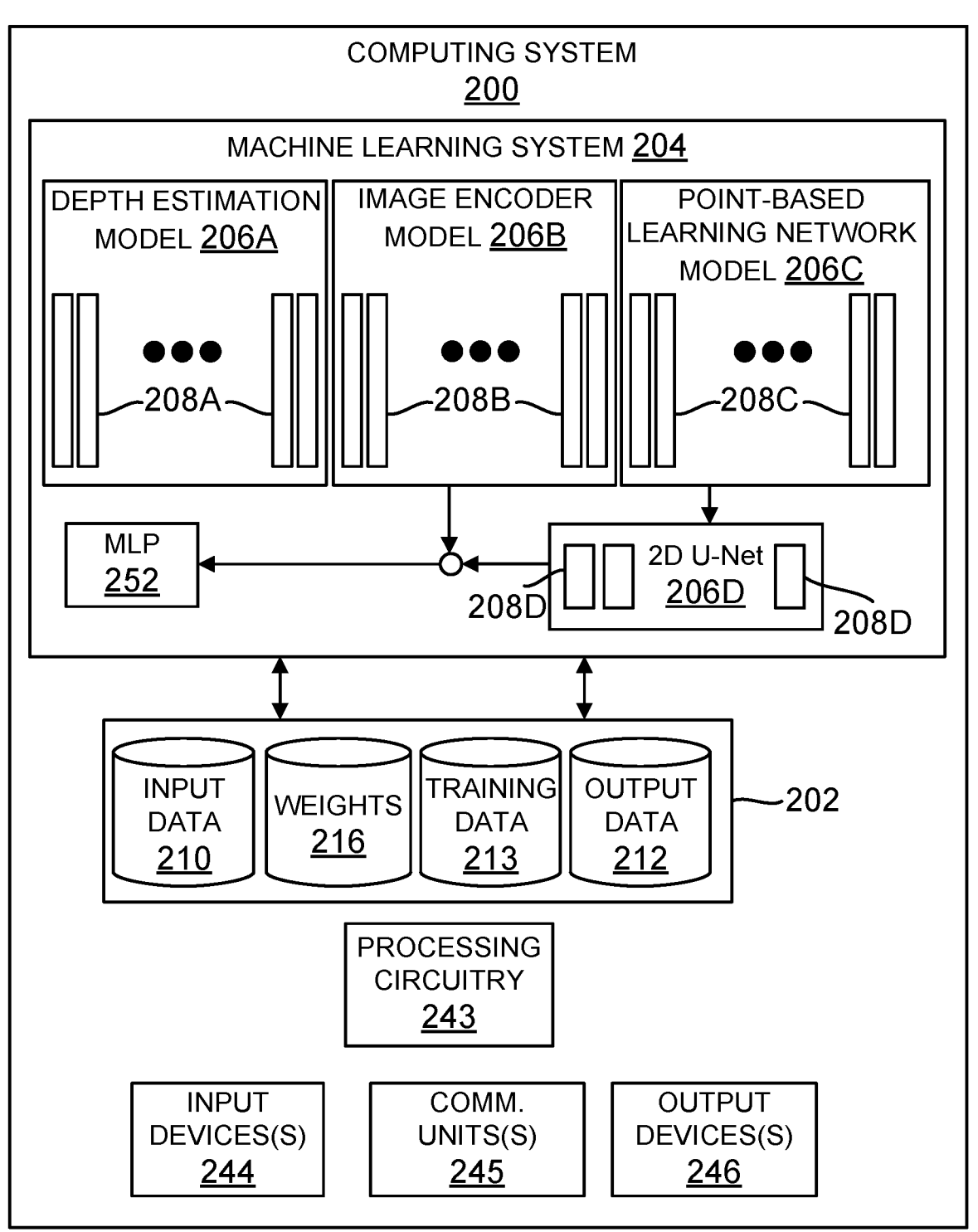
FIG. 2 is a block diagram illustrating an example system that may perform the techniques of this disclosure.

FIG. 2 is a block diagram illustrating an example computing system 200. As shown, computing system 200 comprises processing circuitry 243 and memory 202 for executing a machine learning system 204, which may represent an example instance of any machine learning system described in this disclosure, such as machine learning system 107A of FIG. 1. In an aspect, machine learning system 204 may include one or more neural networks, which may represent example instances of trained neural networks 107B of FIG. 1, such as, depth estimation model 206A, image encoder model 206B, point-based learning network model 206C and 2D U-Net model 206D (collectively, "neural networks 206") comprising respective sets of layers 208A, 208B, 208C, 208D (collectively, "layers 208"). Each of neural networks 206 may comprise various types of neural networks, such as, but not limited to, recursive neural networks (RNNs), CNNs, and deep neural networks (DNNs), as described in greater detail below.

Computing system 200 may also be implemented as any suitable external computing system accessible by processor(s) 102, such as one or more server computers, workstations, laptops, mainframes, appliances, cloud computing systems, High-Performance Computing (HPC) systems (i.e., supercomputing) and/or other computing systems that may be capable of performing operations and/or functions described in accordance with one or more aspects of the present disclosure. In some examples, computing system 200 may represent a cloud computing system, server farm, and/or server cluster (or portion thereof) that provides services to client devices and other devices or systems. In other examples, computing system 200 may represent or be implemented through one or more virtualized compute instances (e.g., virtual machines, containers, etc.) of a data center, cloud computing system, server farm, and/or server cluster. In an aspect, computing system 200 may be an instance of the computing device 104 of FIG. 1

The techniques described in this disclosure may be implemented, at least in part, in hardware, software, firmware or any combination thereof. For example, various aspects of the described techniques may be implemented within processing circuitry 243 of computing system 200, which may include one or more of a microprocessor, a controller, a DSP, an ASIC, an FPGA, or equivalent discrete or integrated logic circuitry, or other types of processing circuitry. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

In another example, computing system 200 comprises any suitable computing system having one or more computing devices, such as desktop computers, laptop computers, gaming consoles, smart televisions, handheld devices, tablets, mobile telephones, smartphones, etc. In some examples, at least a portion of computing system 200 is distributed across a cloud computing system, a data center, or across a network, such as the Internet, another public or private communications network, for instance, broadband, cellular, Wi-Fi, ZigBee, Bluetooth® (or other personal area network-PAN), Near-Field Communication (NFC), ultrawideband, satellite, enterprise, service provider and/or other types of communication networks, for transmitting data between computing systems, servers, and computing devices.

Memory 202 may comprise one or more storage devices. One or more components of computing system 200 (e.g., processing circuitry 243, memory 202) may be interconnected to enable inter-component communications (physically, communicatively, and/or operatively). In some examples, such connectivity may be provided by a system bus, a network connection, an inter-process communication data structure, local area network, wide area network, or any other method for communicating data. Processing circuitry 243 of computing system 200 may implement functionality and/or execute instructions associated with computing system 200. Examples of processing circuitry 243 include microprocessors, application processors, display controllers, auxiliary processors, one or more sensor hubs, and any other hardware configured to function as a processor, a processing unit, or a processing device. Computing system 200 may use processing circuitry 243 to perform operations in accordance with one or more aspects of the present disclosure using software, hardware, firmware, or a mixture of hardware, software, and firmware residing in and/or executing at computing system 200. The one or more storage devices of memory 202, such as for example, data storage device 122 of FIG. 1, may be distributed among multiple devices.

Memory 202 may store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 202, in some examples, may also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 202 may store program instructions and/or data associated with one or more of the modules described in accordance with one or more aspects of this disclosure.

Processing circuitry 243 and memory 202 may provide an operating environment or platform for one or more modules or units (e.g., neural networks 206), which may be implemented as software, but may in some examples include any combination of hardware, firmware, and software. Processing circuitry 243 may execute instructions and the one or more storage devices, e.g., memory 202, may store instructions and/or data of one or more modules. The combination of processing circuitry 243 and memory 202 may retrieve, store, and/or execute the instructions and/or data of one or more applications, modules, or software. The processing circuitry 243 and/or memory 202 may also be operably coupled to one or more other software and/or hardware components, including, but not limited to, one or more of the components illustrated in FIG. 2.

Processing circuitry 243 may execute machine learning system 204 using virtualization modules, such as a virtual machine or container executing on underlying hardware. One or more of such modules may execute as one or more services of an operating system or computing platform. Aspects of machine learning system 204 may execute as one or more executable programs at an application layer of a computing platform.

One or more input devices 244 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 246 may generate, transmit, or process output. Examples of output are tactile, audio, visual, and/or video output. Output devices 246 may include a display, sound card, video graphics adapter card, speaker, presence-sensitive screen, one or more USB interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 244 and one or more output devices 246.

One or more communication units 245 of computing system 200 may communicate with devices external to computing system 200 (or among separate computing devices of computing system 200) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 include a network interface card (e.g., such as an Ethernet card), an optical transceiver, a radio frequency transceiver, a GPS receiver, or any other type of device that can send and/or receive information. Other examples of communication units 245 may include Bluetooth®, GPS, 3G, 4G, and Wi-Fi® radios found in mobile devices as well as Universal Serial Bus (USB) controllers and the like.

In the example of FIG. 2, neural networks 206 may receive input data 210 and may generate output data 212. Combination of data from different neural networks 206 may be used as input data for MultiLayer Perception (MLP) model 252. Input data 210 and output data 212 may contain various types of information. For example, input data 210 may include image data. Output data 212 may include occupancy data, TSDF, 3D mesh of the target scene, and so on.

Each set of layers 208 may include a respective set of artificial neurons. Layers 208A for example, may include an input layer, a feature layer, an output layer, and one or more hidden layers. Layers 208 may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer.

Each input of each artificial neuron in each layer of the sets of layers 208 is associated with a corresponding weight in weights 216. Various activation functions are known in the art, such as Rectified Linear Unit (ReLU), TanH, Sigmoid, and so on.

Machine learning system 204 may comprise a pre-trained model that is trained using training data 213 and one or more pre-trained neural networks 206, in accordance with techniques described herein. It should be noted that training data 213 may be shared by multiple computing devices and/or may be stored at the computing device that performs training of one or more models. The depth estimation model 206A is a machine learning model that is trained to predict the distance of each pixel in an image from the camera. The image encoder 206B is a machine learning model that is trained to compress images while preserving the most important information. The point-based learning network 206C is a type of deep learning model that is designed to learn from and perform tasks on point cloud data. The 2D U-Net model 206D is a convolutional neural network architecture that is specifically designed for semantic image segmentation. Each of the neural networks 206 is described in greater detail with reference to FIG. 3.

In an aspect, machine learning system 204 may also include a MLP model 252 to predict occupancy and TSDF data. The MLP model 252 is a type of artificial neural network that is composed of multiple layers of interconnected neurons. The MLP model 252 may be able to learn complex relationships between input and output data by adjusting the weights 216 of the connections between neurons. The MLP 252 may be trained using the backpropagation algorithm. Backpropagation is a supervised learning algorithm that calculates the gradient of the loss function with respect to the weights 216 of the MLP model 252. This gradient may then be used to update the weights 216 of the MLP model 252 in the direction that minimizes the loss function.

As noted above, conventional 3D CNN techniques for image reconstruction are expensive to run on-device and significantly limit the resolution of the reconstruction. Specifically, the memory and processing costs are cubic with respect to resolution because 3D CNNs operate on 3D volumes of data. In other words, the number of parameters and operations in the network grows cubically with the resolution of the volume. Each voxel in the volume needs to store its activation values for all of the feature maps in the network. The number of feature maps in a 3D CNN is typically very large, often hundreds or thousands. The volume size is typically also very large, especially for high-resolution reconstructions.

Figure 3:
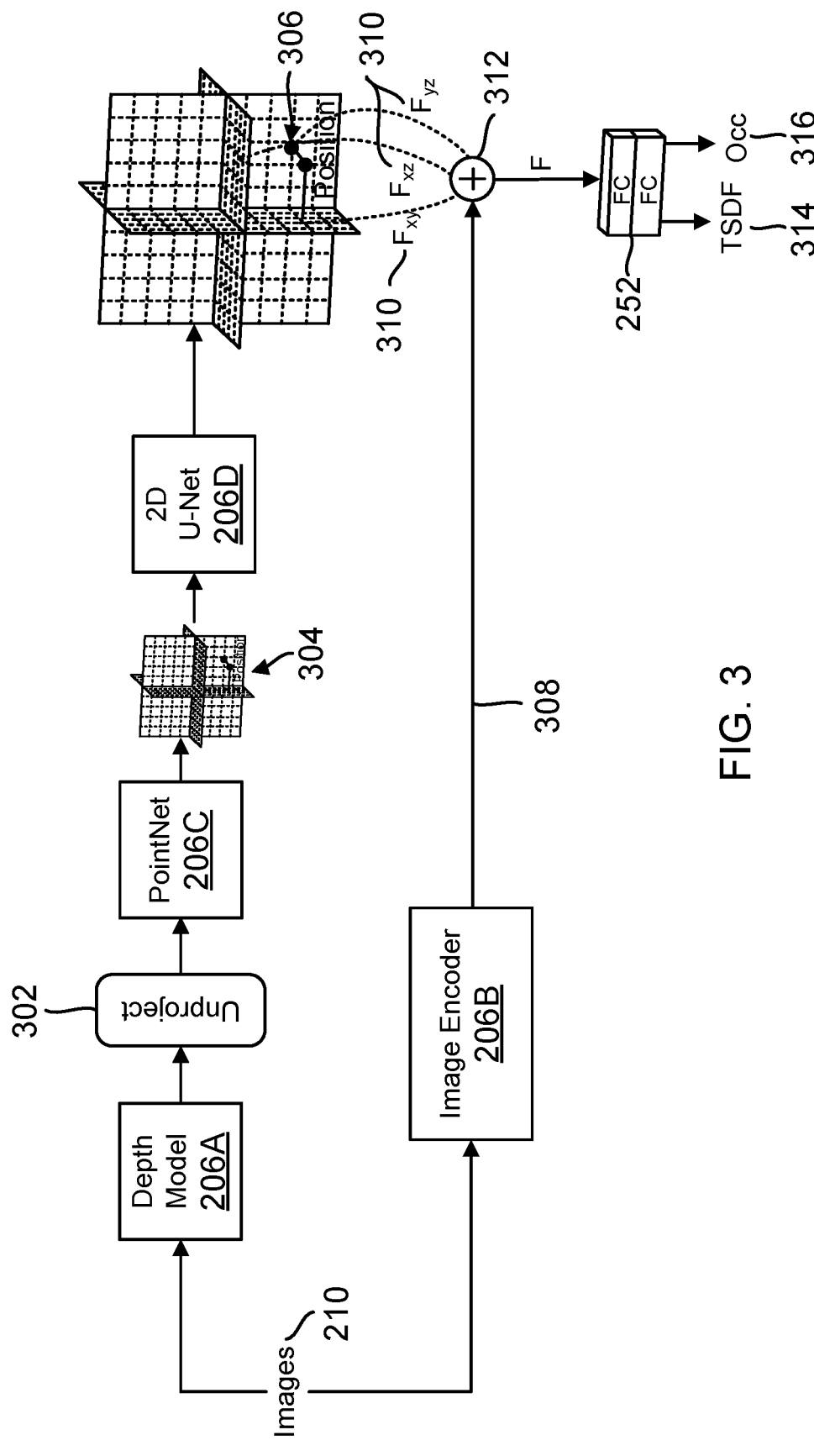
FIG. 3 is a diagram illustrating an example 3D triplane representation framework that may perform the techniques of this disclosure.

FIG. 3 is a diagram illustrating an example 3D triplane representation framework that may perform the techniques of this disclosure. FIG. 3 is provided for purposes of explanation and should not be considered limiting of the techniques as broadly exemplified and described in this disclosure. For purposes of explanation, this disclosure describes framework 300 illustrated in FIG. 3 that may be configured to leverage points and triplane representation for 3D reconstruction. In the example of FIG. 3, the depth estimation model 206A and the image encoder model 206B may receive input data 210. In an aspect, input data 210 may include a plurality of images acquired by a plurality of 2D imaging devices 112. At least some of the aforementioned input to the neural networks 206 may be a monocular video with camera poses and intrinsics for each image. In other words, both the depth estimation model 206A and image encoder model 206B may have access to the following information: the images themselves, the position and orientation of the camera for each image, the intrinsic parameters of the camera, such as, but not limited to, the focal length and distortion coefficients. The intrinsic information and camera poses may be essential for the machine learning model 204 to be able to reconstruct the 3D scene. The camera poses and intrinsics may allow the machine learning model 204 to understand how the images are related to each other and to the 3D world. The images may provide the machine learning system 204 with the visual information it needs to reconstruct the appearance of the scene.

In an aspect, the machine learning system 204 may sample a bounding box of a predetermined size (e.g., 3.84× 3.84×2.24 meters) from the scene geometry with random translation and rotation. For example, the machine learning system 204 may perform the following steps to sample a bounding box of a predetermined size. The machine learning system 204 may generate a random translation and rotation, for example, by generating a random 3D vector for the translation and a random quaternion for the rotation. The generated 3D vector may represent the displacement of the bounding box's center point from its original position. The coordinates of the 3D vector may be generated using a random number generator, ensuring that the translation values fall within a specified range. For random rotation, a quaternion may be employed. A quaternion is a mathematical representation of a rotation in 3D space. The quaternion may consist of four elements: a scalar component and three vector components. To generate a random quaternion, random values may be assigned to these components, ensuring they satisfy the normalization constraint. Next, the machine learning system 204 may apply the translation and rotation to the scene geometry to transform the scene geometry into a new coordinate frame. In an aspect, the machine learning system 204 may find the bounding box that contains the transformed scene geometry by using a standard 3D bounding box algorithm, for example. The machine learning system 204 may use the bounding box of the predetermined size (e.g., 3.84×3.84×2.24 meters). Next, the machine learning system 204 may randomly sample, for example, 20 images where the bounding box is visible to each view. Randomly sampling images where the bounding box is visible may ensure that the dataset includes a variety of viewpoints of the object. Such variability may help the machine learning system 204 learn to detect and localize the object regardless of its orientation and position in the scene. Choosing a specific number of images to sample, such as 20, determines the size of the dataset. A larger dataset may lead to better model performance; however, the larger dataset may also require more training time and computational resources. The procedure described above may be used by the machine learning system 204 to generate a dataset of images of a bounding box from different viewpoints.

In an aspect, the depth estimation model 206A may be configured to use input data 210 (images acquired by at least one of the plurality of 2D imaging devices 212) to determine the distance of objects in the environment. In an aspect, the depth estimation model 206A may analyze the size and shape of objects in the images, as well as the shadows and highlights to calculate the distance of each pixel in the image from the camera used to acquire that image. Such calculation may be a challenging task, as it may require the depth estimation model 206A to understand the 3D structure of the scene from a single 2D image. In an aspect, the depth estimation model 206A may comprise a deep neural network that leverages multiple images to improve depth prediction accuracy (e.g., a multiview network). For example, to run the depth estimation model 206A to get the depth (of resolution 192×256), the machine learning system 204 may perform the following steps. The machine learning system 204 may resize the input image to 192×256. Next, the machine learning system 204 may normalize the input image to the range [0, 1]. The machine learning system 204 may feed the normalized input image to the depth estimation model 206A. The depth estimation model 206A may output a depth map of the same resolution as the input image. In an aspect, the machine learning system 204 may utilize the depth map for the subsequent 3D scene reconstruction tasks.

In an aspect, the machine learning system 204 may next unproject depth to a 3D point cloud. Unprojection process may involve converting the depth information associated with each pixel in the depth map into corresponding 3D coordinates in space. The basic principle of depth map unprojection relies on the camera's intrinsic and extrinsic parameters, which may include the focal length, principal point, and distortion coefficients. These parameters define the relationship between pixel coordinates in the depth map and corresponding 3D world coordinates. Accordingly, to perform depth map unprojection, the machine learning system 204 may utilize at least the following information: the depth map, the camera pose and the intrinsic parameters of the camera. The depth map is a 2D image that represents the distance of each pixel in the image from the camera. The camera pose is the position and orientation of the camera in the world. The intrinsic parameters of the camera are parameters such as the focal length and distortion coefficients. In an aspect, for each pixel in the depth map, the machine learning system 204 may unproject the pixel onto the camera coordinate frame. The machine learning system 204 may then use the camera pose to transform the projection from the camera coordinate frame to the world coordinate system, which may be considered as the unprojection of the depth to a 3D point cloud. The transformed projection may be the 3D coordinate of the point in the world.

Points are more memory efficient than grid points that are used in the state-of-the-art FineRecon system because points may be a sparser representation of the 3D scene. A grid of points may be a dense representation of the scene, with a point at every location in the grid. The grid of points may be very memory inefficient, especially for high-resolution scenes. Points, on the other hand, are only placed at locations where there is actually something in the scene. 192× 256×20 points requires 983,040 bytes of memory, while 96×96×56×20 grid points (used by FineRecon) requires 10,321,920 bytes of memory because points only store the XYZ coordinates of each point, while grid points also store the voxel values at each point. Unprojecting image features as additional attributes of 3D points is a good way to improve the memory efficiency of the FineRecon system because image features are typically much smaller than voxel values, and the image features may be stored in a separate data structure. Following are some additional benefits of using points instead of grid points. Points are more flexible. Points may be used to represent a wider variety of 3D shapes, including surfaces with complex geometries. Points are more efficient for rendering. Points may be rendered directly using a GPU, without the need to convert them to a grid. Points are more efficient for collision detection. Points may be used to perform collision detection directly, without the need to convert them to a grid.

In an aspect, the machine learning system 204 may randomly downsample points to N points, where N=100 k or N=20K. For example, the machine learning system 204 may randomly generate a set of N indices. The machine learning system 204 may select the points at the generated indices and may return the selected points. In an aspect, the downsampled points may be returned as a list of 3D points, which may be used as input into point-based learning network model 206C.

In an aspect, the point-based learning network model 206C may have a PointNet architecture. PointNet is a deep learning architecture that directly consumes raw point clouds (sets of points) without voxelization or rendering. PointNet is a unified architecture that learns both global and local point features, providing a simple, efficient, and effective approach for a number of 3D recognition tasks. PointNet is based on the following key ideas: symmetry, locality and globality. Point clouds are invariant to permutations of their points. The point-based learning network model 206C may achieve symmetry by using a symmetric function, such as max pooling, to aggregate the features of all points in the cloud. The point-based learning network model 206C may learn local features by using a shared point encoder network to process each point independently. The point encoder network may take the coordinates of each point as input and may output a feature vector. The point-based learning network model 206C may learn global features by aggregating the local features of all points in the cloud. In an aspect, the point-based learning network model 206C may learn global features using a variety of methods, such as, but not limited to, max pooling, average pooling, or a combination of both.

In an aspect, the point-based learning network model 206C may be implemented as a point transformer. Point transformers are a type of point-based learning network that is inspired by the success of transformers in natural language processing. Point transformers may use a self-attention mechanism to learn long-range dependencies between points in a point cloud. The self-attention mechanism may allow the point transformers to learn more complex and informative features than other types of point-based learning networks.

In yet another aspect, the point-based learning network model 206C may be implemented as LocalPoolPointNet. The LocalPoolPointNet is a point-based learning network that uses local pooling to aggregate the features of nearby points. Local pooling may allow the point-based learning network model 206C to only consider the local features for points that fall within the same grid of each plane (of the triplane).

The point-based learning network model 206C implemented as LocalPoolPointNet may be used to project the N points to triplanes (with resolution 256×256×114 for each axis) in the following steps. The point-based learning network model 206C may divide N points into one or more smaller subregions. For each subregion, the point-based learning network model 206C may aggregate the features of the points in the subregion using local pooling.

In an aspect, the point-based learning network model 206C may project the aggregated features to a triplane of resolution 256×256×114 for each axis. This resolution is 2× higher than the feature volume used in the FineRecon (96×96×56) for the same spatial range (3.84×3.84×2.24 meters). In other words, the point-based learning network model 206C may learn more detailed features than the FineRecon system. The higher resolution of the triplane in the point-based learning network model 206C may allow the point-based learning network model 206C to learn more detailed features than the FineRecon because each triplane may represent a smaller spatial region than the feature volume in the FineRecon. As a result, the point-based learning network model 206C may learn more local features, such as, but not limited to, the fine details of the surface of an object. In summary, the point-based learning network model 206C may project 3D points to 3 2D planes, to generate 3 2D feature maps 304.

In an aspect, the generated 3 2D feature maps 304 may be used as input into the 2D U-Net model 206D. The 2D U-Net model 206D may have a CNN architecture that is designed for image segmentation. The 2D U-Net model 206D is a modified version of the fully convolutional network (FCN) architecture. The U-Net architecture is based on the following key ideas: encoder-decoder structure, skip connections and up-sampling. The U-Net architecture consists of two main parts: an encoder and a decoder. The encoder may extract features from the input image, and the decoder may generate a segmentation mask from the extracted features. The encoder and decoder may be connected by skip connections. These skip connections may allow the decoder to access the features extracted by the encoder at different levels. These skip connections may help the decoder to generate more accurate segmentation masks.

The decoder of the 2D U-Net model 206D may use up-sampling layers to increase the resolution of the segmentation mask. Up-sampling may ensure that the segmentation mask has the same resolution as the input image. Following are some of the benefits of using a the 2D U-Net model 206D. The 2D U-Net model 206D may generate very accurate segmentation masks, even for complex objects. The 2D U-Net model 206D may be relatively fast to train and infer, making the 2D U-Net model 206D suitable for real-time applications. The 2D U-Net model 206D may require less memory than other CNN architectures, such as 3D U-Nets, for example. In an aspect, the 2D U-Net model 206D may process triplane features (instead of using a 3D ConvNet to process the feature volume as in FineRecon). In an aspect, the 2D U-Net model 206D may roll out the triplane features into a 2D feature map. In an aspect, the aforementioned rollout may be implemented by concatenating the triplane features along the channel dimension. For example, if the triplane features have dimensions CYX, CZY, and CZX, then the rolled-out feature map may have dimensions C(Y+2Z)X. Applying 3D-aware Conv2d layers to the rolled-out feature map may allow the 2D U-Net model 206D to learn 3D features from the 2D feature map.

Processing triplane features with the 2D U-Net model 206D has several advantages over using a 3D ConvNet to process the feature volume. The 2D U-Net model 206D may be more efficient in terms of memory and computation. The 2D U-Net model 206D may be easier to train, as the 2D U-Net model 206D may be less prone to overfitting. The 2D U-Net model 206D may learn more global features, as the 2D U-Net model 206D may access information from all three triplanes simultaneously.

The machine learning system 204 may query 306 triplane features 310 at test positions on 96×96×56 grid points. In an aspect, the machine learning system 204 may perform the following steps to query 306 triplane features 310. The machine learning system 204 may project the test positions onto the 3 2D planes. For each test position, the machine learning system 204 may extract the features from the corresponding 2D plane. If the test position does not project to an integer coordinate in a 2D plane, the machine learning system 204 may use interpolation to generate the feature based on features from neighboring coordinates. More detailed explanation of each of the aforementioned steps is provided below.

In an aspect, the machine learning system 204 may project the test positions onto the 3 2D planes using the following equation (1):

$$projected\_position = projection\_matrix @ test\_position \qquad (1)$$

where:

projected_position is a 3×1 vector representing the projected position in the 2D plane;

projection_matrix is a 3×3 matrix that represents the projection from 3D to 2D;

test_position is a 3×1 vector representing the test position in 3D.

For the next step, the machine learning system 204 may extract the features from the corresponding 2D plane using the following equation (2):

$$features = triplane\ features[i][:,projected\_position[0], \\ projected\_position[1]] \qquad (2)$$

where:

features is a vector of features extracted from the 2D plane;

triplane features is a list of the 3 triplane features;

i is the index of the 2D plane;

projected_position is the projected position in the 2D plane.

As noted above, if the test position does not project to an integer coordinate in a 2D plane, the machine learning system 204 may use interpolation to generate the feature based on features from neighboring coordinates. In an aspect, the machine learning system 204 may use bilinear interpolation. Bilinear interpolation works by taking the average of the four nearest neighbors to the test position, weighted by their distance to the test position.

In an aspect, bilinear interpolation may be used to generate the feature for the test position by passing in the triplane feature map and the projected position.

In an aspect, the machine learning system 204 may use the image encoder model 206B. An image encoder is a type of neural network that takes an image as input and produces a compressed representation of the image, called a latent code. The latent code may be a vector of numbers that captures the most important information in the image, such as, but not limited to image's shape, color, and texture.

In an aspect, the machine learning system 204 may implement image encoder output projection. The image encoder output projection is the process of projecting the latent code output by an image encoder onto a lower-dimensional space. In one implementation, the machine learning system 204 may project the latent code using a linear projection matrix. The linear projection matrix is a matrix that may be learned during training to project the latent code onto the desired lower-dimensional space.

In another implementation, the machine learning system 204 may project the latent code using a non-linear projection function. The non-linear projection function is a function that may be learned during training to project the latent code onto the desired lower-dimensional space in a non-linear way. In an aspect, to sample image features at 2D points, the machine learning system 204 may project the 3D query points to 2D. For each 2D point, the machine learning system 204 may get the corresponding image features from the output of the image encoder model 206B. Once the latent code has been projected, the machine learning system 204 may sample the image features at any 2D point. For example, the machine learning system 204 may sample the image features at the center of the image.

Advantageously, the image encoder output projection may be used to make the latent code easier to interpret. As another advantage, sampling image features at 2D points may allow the machine learning system 204 to get very precise information about the image at specific locations.

In an aspect, the machine learning system 204 may combine triplane and image features at test positions. Concatenation of the triplane and image features at test positions may allow the machine learning model 204 to learn more complex relationships between the 3D structure of an object and object's appearance in the image. There may be different ways to aggregate/reduce the plane features while combining the plane features with the image features, and the example techniques are not limited to a particular way. Some methods include, but are not limited to: concat, sum, multiply, and the like. Concat method 312 may involve simply concatenating the triplane features 310 and image features along the channel dimension. The result of the concat method may be a feature vector that is the sum of the triplane features 310 and image features.

In an aspect, the machine learning system 204 may pass the concatenated triplane and image features at test positions through MLP 252 to predict occupancy values 316 and TSDF values 314. The MLP 252 is described in greater detail below in relation to FIG. 4. The predicted occupancy values 316 and TSDF values 314 may then be used by the machine learning system 204 for a 3D reconstruction and scene understanding. SDF and TSDF are both ways to represent 3D space, but they have different strengths and weaknesses.

SDF is a more general representation of 3D space, as SDF may represent both the interior and exterior of surfaces. However, SDF may be noisy and computationally expensive to compute. TSDF is a simpler representation of 3D space, but TSDF is more robust to noise and less computationally expensive to compute. However, TSDF may not represent the interior of surfaces. In practice, TSDF is often used in 3D reconstruction tasks, as TSDF may be a good compromise between accuracy and efficiency. The aforementioned technique of combining 312 triplane 310 and image features may improve the performance of occupancy and TSDF prediction tasks.

In addition, the machine learning system 204 may provide ground truth TSDF and occupancy as supervision for the MLP 252. Providing ground truth TSDF and occupancy as supervision may help the MLP 252 to learn more accurate representations of these quantities. Furthermore, providing ground truth TSDF and occupancy may lead to improved performance on a 3D reconstruction and scene understanding. In an aspect, the MLP 252 may learn to predict TSDF and occupancy more accurately when the MLP has ground truth supervision. The MLP 252 is less likely to overfit to the training data when the MLP 252 has ground truth supervision. The MLP 252 may be more likely to generalize to new data when the MLP 252 has ground truth supervision. For example, a variety of methods may be used to collect ground truth data, such as 3D scanners and depth sensors. Furthermore, the machine learning system 204 may filter and clean the ground truth data to reduce noise. It should be noted that the machine learning system 204 may use a subset of the ground truth data for the training data 213 and the remaining data for validation and testing. The machine learning system 204 may also use regularization techniques to prevent the MLP 252 from overfitting to the training data.

Once the machine learning system 204 has the TSDF 314 and/or occupancy values 316 for a set of points in space, the machine learning system 204 may use a variety of methods to convert them to a 3D mesh, such as, but not limited to: marching cubes, point cloud filtering, Delaunay triangulation.

Marching cubes is a popular algorithm for converting SDF/TSDF values to 3D meshes. In an aspect, the machine learning system 204 may also use point cloud filtering algorithms to extract a mesh from a point cloud of SDF/TSDF values. The machine learning system 204 may also use Delaunay triangulation to create a mesh from a set of SDF/TSDF values. There are a number of benefits to using SDF/TSDF or occupancy values to create 3D meshes. SDF/TSDF values may be used to create very accurate 3D meshes, even for complex objects. SDF/TSDF values are robust to noise, which makes them well-suited for use with real-world data.

Figure 4:
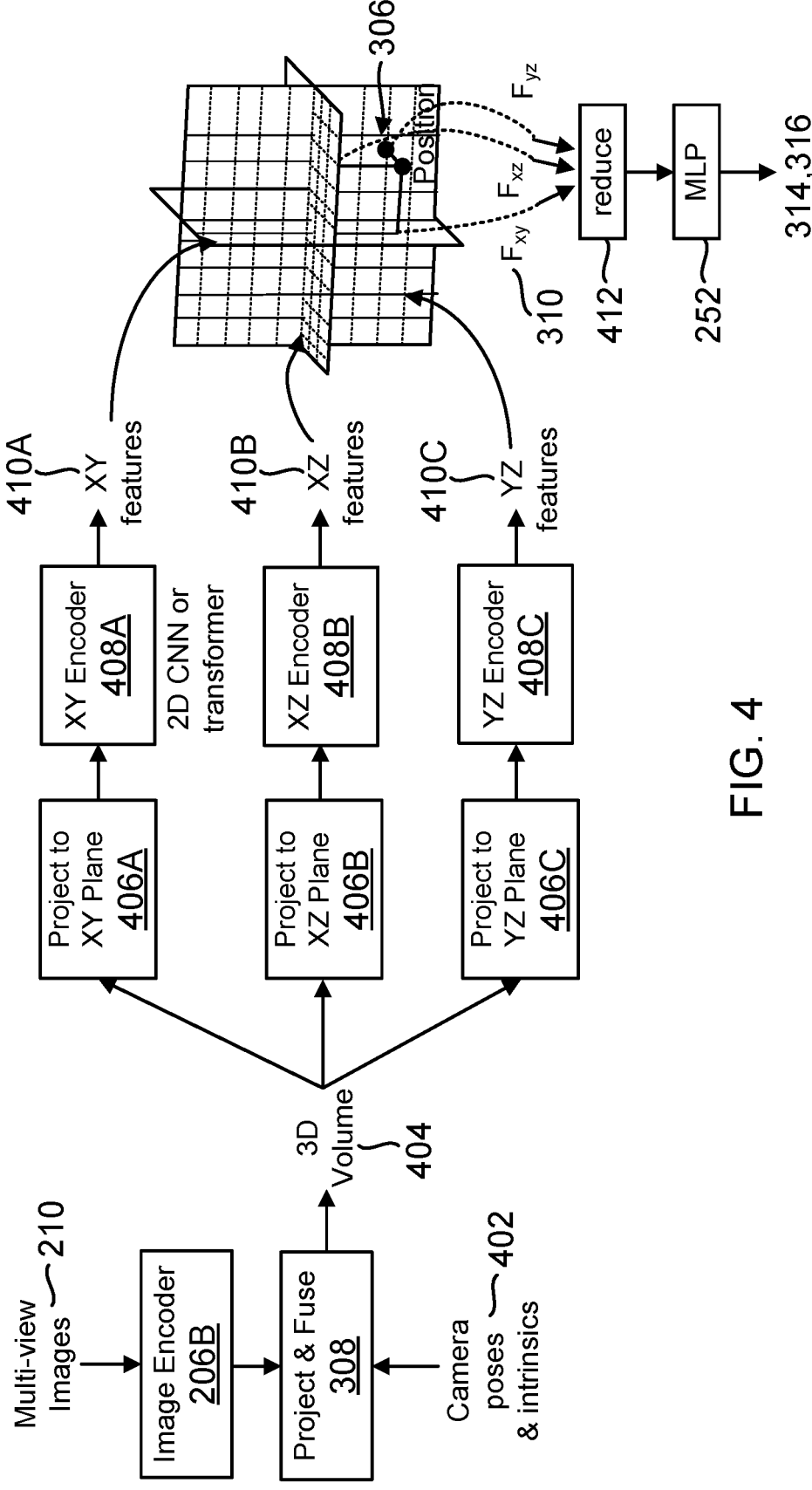
FIG. 4 is a diagram illustrating an example projection of points to 3D volume, in accordance with the techniques of this disclosure.

FIG. 4 is a diagram illustrating an example projection of points to 3D volume, in accordance with the techniques of this disclosure. Leveraging the 3D triplane representation is a powerful way to improve the performance of a variety of 3D computer vision tasks.

The 3D triplane representation is a way of representing a 3D object as three orthographic projections of the object. The three projections may be aligned with the x, y, and z axes, respectively. The 3D triplane representation is very efficient, both in terms of memory and computation. The 3D triplane representation is well-suited for use in real-time applications.

The 3D triplane representation is very expressive, and the 3D triplane representation may be used to represent a wide variety of 3D objects. The 3D triplane representation may be used with a variety of different machine learning models, such as CNNs and RNNs. As shown in FIGS. 3 and 4, one way to leverage the 3D triplane representation is to concatenate the triplane features with the image features.

In an aspect, input data 210 may include a plurality of multi-view images. Multi-view images are a set of two or more images of the same scene taken from different viewpoints. Multi-view images may be used to reconstruct 3D models of the scene.

In an aspect, the input data 210 may be fed into the image encoder 206B. The image encoder 206B may be a neural network that takes an image as input and produces a compressed representation of the image, called a latent code. The latent code may be a vector of numbers that captures the most important information in the image, such as, but not limited to image's shape, color, and texture. In an aspect, the machine learning system 204 may use project and fuse technique 308. Project and fuse 308 is a technique for combining the latent codes from multiple image encoders to produce a single latent code that represents the entire scene. Project and fuse 308 may be implemented using a variety of methods, such as, but not limited to, averaging or max pooling. In an aspect, the machine learning system 204 may use camera poses and intrinsics 402 for the project and fuse technique 308. Camera poses and intrinsics 402 are parameters that describe the position and orientation of the camera in space. Camera poses may be represented by a rotation matrix and a translation vector. Camera intrinsics may be represented by a focal length, principal point, and skewness coefficient, for example.

In an aspect, the machine learning system 204 may extract the latent codes from the multi-view images 210 using the image encoder 206B. This step may be implemented by passing each image 210 through the image encoder 206B and extracting the latent code.

The machine learning system 204 may project and fuse the latent codes and may combine them to produce a single latent code that represents the entire scene. For example, the machine learning system 204 may implement the project and fuse operation 308 using a variety of methods, such as, but not limited to, averaging or max pooling. Machine learning system 204 may use the camera poses and intrinsics 402 to reconstruct the 3D volume 404 from the latent code.

In an aspect, converting the 3D volume 404 into features on multiple planes may be a more efficient and effective way to process the volume than using 3D convolutions, especially for large and complex volumes. 2D convolutions are more efficient than 3D convolutions, therefore converting the 3D volume 404 into features on multiple planes may lead to significant speedups. 2D convolutions may be more effective at capturing certain types of features, such as planar features. Accordingly, 2D convolutions may make converting the 3D volume 404 into features on multiple planes a more effective way to process the 3D volume 404 for certain tasks. For example, if the machine learning system 204 has the 3D volume 404 of an object, the machine learning system 204 may convert this 3D volume 404 into features on multiple planes by implementing the following steps. The machine learning system 204 may slice the 3D volume 404 into three orthogonal planes: XY, XZ, and YZ. The machine learning system 204 may apply 2D convolutions to each plane to extract features. The machine learning system 204 may concatenate the features from all three planes.

In other words, by concatenating the features the machine learning system 204 may produce a single feature vector that represents the entire 3D volume 404.

As shown in FIG. 4, the machine learning system 204 may first project to XY plane 406A, project to XZ plane 406B, and project to YZ plane 406C. In an aspect, such projection may be implemented using a variety of methods, such as, but not limited to, bilinear or trilinear interpolation. The generated projected features may be used respectively as input into XY encoder 408A, XZ encoder 408B and YZ encoder 408C.

XY encoder 408A, XZ encoder 408B and YZ encoder 408C are three neural networks that may take the projected features from the XY, XZ, and YZ planes as input and may produce a feature vector for each plane.

In an aspect, XY features 410A, XZ features 410B and YZ features 410C may be the feature vectors produced by the XY encoder 408A, XZ encoder 408B, and YZ encoder 408C, respectively. In an aspect, the machine learning system 204 may concatenate XY features 410A, XZ features 410B, and YZ features 410C to produce a single feature vector that represents the entire 3D volume 404.

As noted above, the project and fuse operation 308 may be more efficient than using 3D convolutions, especially for large and complex volumes. Project and fuse 308 may be more effective at capturing certain types of features, such as planar features. Furthermore, the project and fuse operation 308 may be used with a variety of different neural network architectures, such as CNNs and transformers.

In an aspect, the machine learning system 204 may use more than 3 planes in the project and fuse operation 308. For example, the machine learning system 204 may use 6 planes. For instance, considering, for illustration purposes only, a simple object like a cube, the machine learning system 204 may acquire images from three orthogonal directions (front, top, and side), which might suffice to reconstruct cube's basic shape. However, using 6 planes, including angles in between the orthogonal directions, would provide more details about the edges and corners, leading to a more accurate representation. Using 6 planes may allow the machine learning system 204 to capture more information from the 3D volume 404 but using 6 planes may also increase the memory and computation costs. More specifically, the memory and computation costs of the project and fuse operation 308 are quadratic with respect to the spatial resolution of the feature processing stage. In other words, the memory and computation costs increase exponentially as the spatial resolution increases because the project and fuse operation 308 may require the machine learning system 204 to project the 3D volume 404 onto multiple planes and then process the projected images with a neural network.

There are a number of ways to reduce the memory and computation costs of the project and fuse operation 308. For example, smaller neural networks may require less memory and computation. However, smaller neural networks may not be as accurate as larger neural networks. A lower spatial resolution may result in smaller projected images, which may reduce the memory and computation costs. However, lower spatial resolution may also reduce the amount of information that may be captured from the 3D volume 404. A hierarchical technique may involve the machine learning system 204 projecting the 3D volume 404 onto multiple planes at different levels of resolution. The projected images at each level may then processed with a neural network. The hierarchical technique may reduce the memory and computation costs, but it may also reduce the accuracy of the model. The way to reduce the memory and computation costs of the project and fuse technique may depend on the specific application. For example, if accuracy is more important than speed, then the machine learning system 204 may use a larger neural network architecture and a higher spatial resolution. However, if speed is more important than accuracy, then the machine learning system 204 may use a smaller neural network architecture and a lower spatial resolution.

As noted above and shown in FIG. 4, the machine learning system 204 may reduce 412 the plane features 310 before sending them to the MLP 252. Reducing 412 the plane features 310 may help to improve the performance of the MLP 252 by reducing the chance of overfitting. Reducing 412 the plane features 310 may also reduce the computational costs of training and inferring with the MLP 252.

Figure 5A:
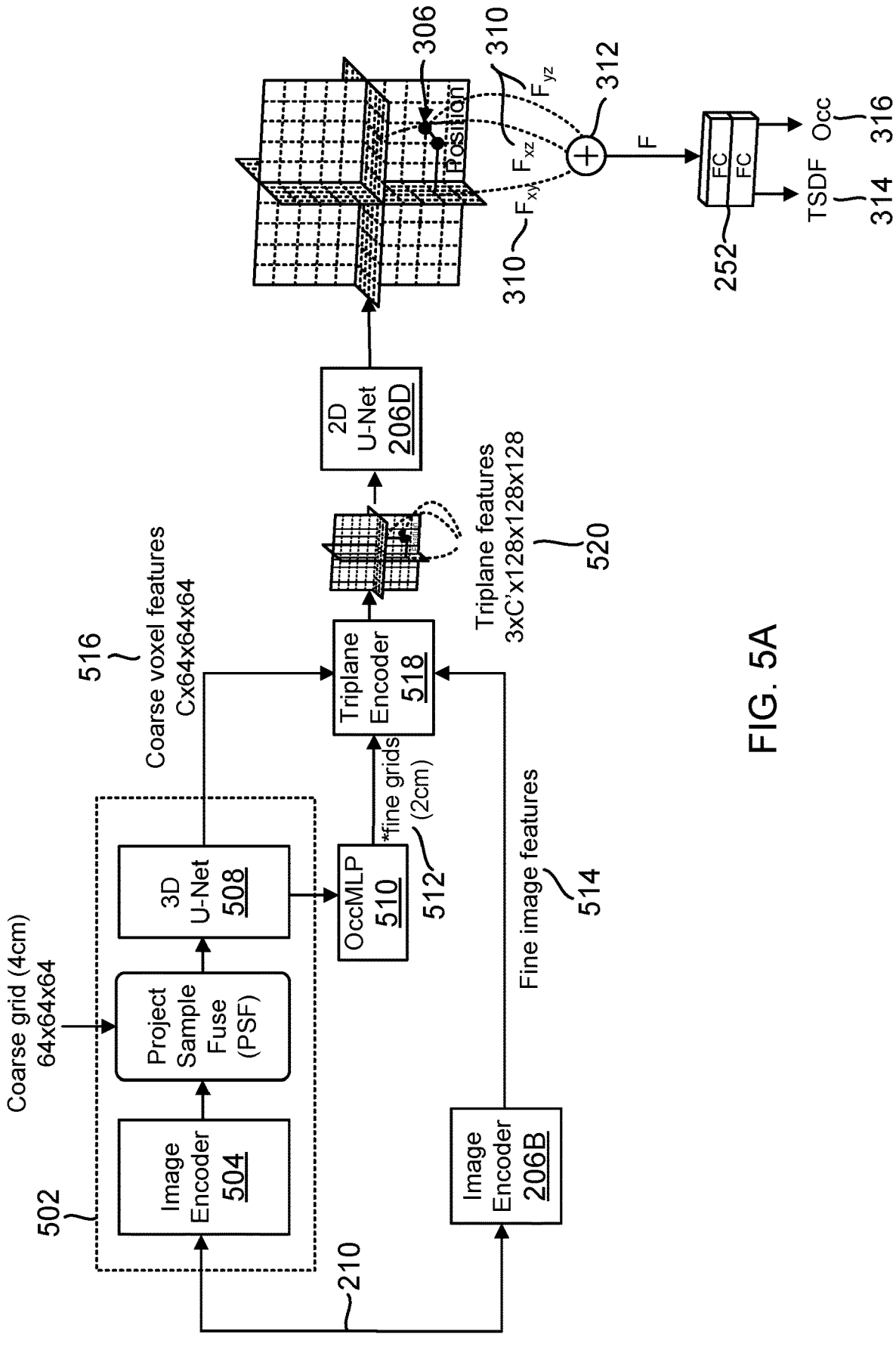
FIGS. 5A and 5B are block diagrams illustrating an example of an alternative 3D triplane representation framework that may perform the techniques of this disclosure.
Figure 5B:
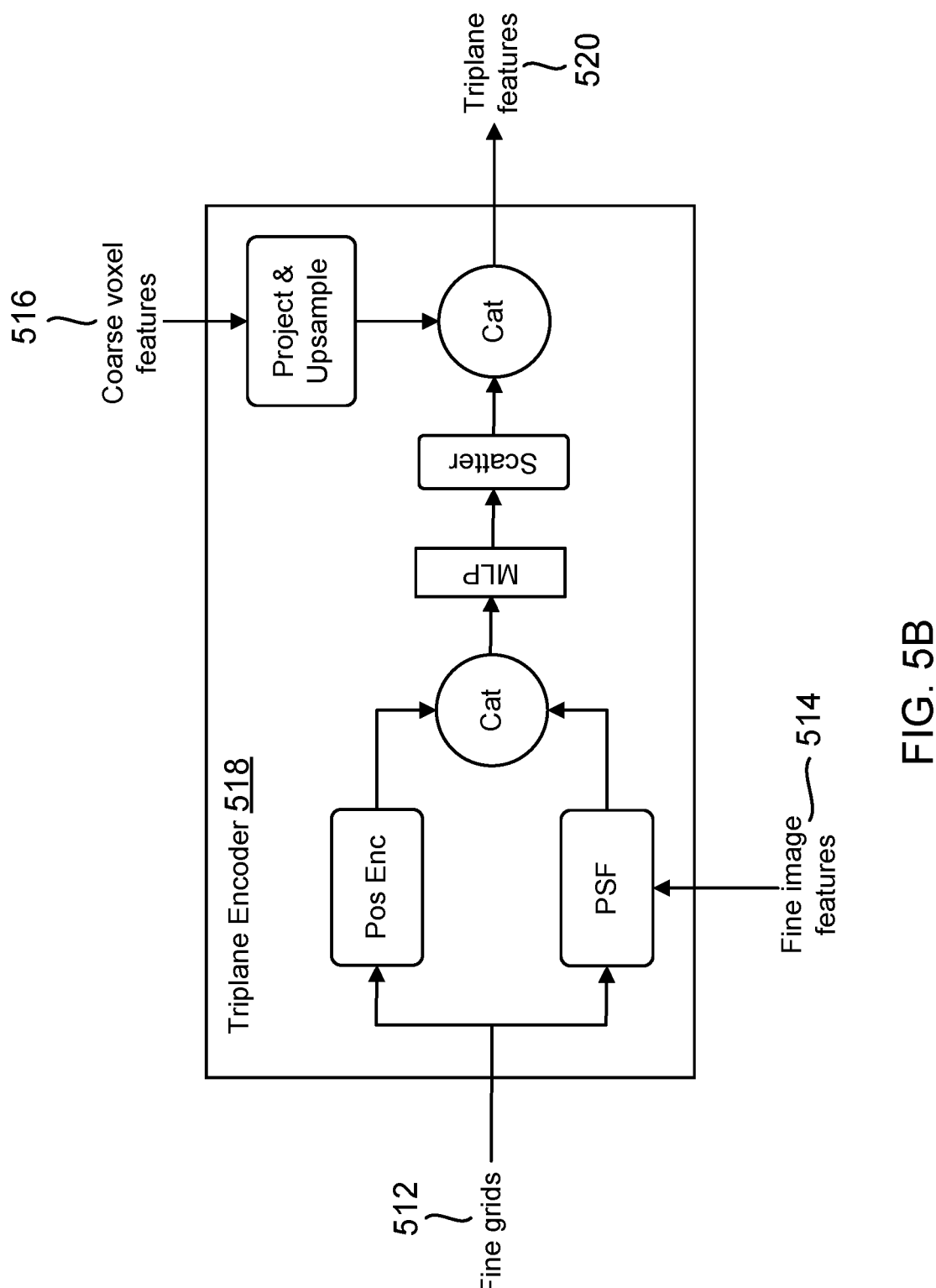

FIGS. 5A and 5B are block diagrams illustrating an example of an alternative 3D triplane representation framework that may perform the techniques of this disclosure. It should be noted that implementation shown in FIG. 5 does not use the depth estimation model 206A. The architecture shown in FIG. 5 is a coarse to fine architecture that uses multi-view images to reconstruct a scene as a 3D triplane representation. The architecture may consist of two main stages: a coarse stage and a fine stage. The coarse stage 502 may use the image encoder 504 and a 3D U-Net model 508 to predict a coarse representation of the scene 516. The machine learning system 204 may implement prediction of a coarse representation of the scene 516 by first projecting the multi-view images 210 onto a 3D volume representation 314, as described above. The projected 3D volume representation may then be passed through the 3D U-Net 508 to predict the coarse representation 516. The fine stage may use a more complex neural network, triplane encoder 518 to refine the coarse representation 516 predicted by the coarse stage 502. The triplane encoder 518 may take the coarse representation 502 and fine image features 514 as input and may predict a refined 3D triplane representation 520 for each plane. The coarse to fine architecture may be beneficial for a number of reasons. The coarse to fine architecture may allow the machine learning model 204 to learn coarse and fine-grained features of the scene in two separate stages. Having two separate stages may lead to improved accuracy, especially for complex scenes.

The coarse to fine architecture may reduce computational costs by only processing the full resolution images in the fine stage. This type of processing may be important for real-time applications.

In an aspect, the coarse representation 516 may be a low-resolution representation of the scene. For example, the coarse representation 516 may have a resolution of 64×64× 64. The coarse representation 516 may be used by the machine learning system 204 as the input to the fine stage. In an aspect, at the fine stage, the machine learning system 204 may use a more complex neural network called the triplane encoder 518.

In an aspect, the refined 3D triplane representation 520 may be a higher-resolution representation of the scene. For example, the refined 3D triplane representation 520 may have a resolution of 128×128×128. The refined 3D triplane representation 520 may be used by the machine learning system 204 for scene reconstruction. More specifically, in an aspect, the machine learning system 204 may use the triplane encoder 518 to integrate the coarse reconstruction features 516 and fine image features 514. In an aspect, the triplane encoder 518 may allow the fine stage to learn from both the coarse reconstruction features 516 and the fine image features 514. The coarse reconstruction features 516 may provide the fine stage with a global understanding of the scene, while the fine image features 514 may provide the fine stage with detailed information about the scene.

By integrating the coarse reconstruction features 516 and fine image features 514, the triplane encoder 518 may be able to predict a more accurate and detailed 3D triplane representation 520.

In an aspect, the machine learning system 204 may perform an occupancy prediction using the occupancy MLP 510 prior to the fine stage performed by the triplane encoder 518.

In an aspect, performing an occupancy prediction using the occupancy MLP 510 prior to the fine stage performed by the triplane encoder 518 may be beneficial for a number of reasons. In an aspect, the occupancy MLP 510 may help to improve the accuracy of the fine stage performed by the triplane encoder 518 by providing it with an initial prediction of which voxels may be occupied. Such information may help the triplane encoder 518 to focus its attention on the most likely voxels, which may lead to improved accuracy. The occupancy MLP 510 may help to reduce the computational cost of the fine stage by reducing the number of voxels that the triplane encoder 518 needs to process because the triplane encoder 518 may skip processing voxels that are predicted to be unoccupied by the occupancy MLP 510. The occupancy MLP 510 may be implemented as a simple neural network. The occupancy MLP 510 may be trained to predict which voxels are occupied using a variety of different features, such as, but not limited to the pixel intensities of the multi-view images and the depth information from the multi-view images.

In an aspect, the machine learning system 204 may sample fine grids 512 generated by the occupancy MLP 510. Sampling is a process of selecting a subset of voxels from the fine grid 512 to be processed by the triplane encoder 518 during the fine stage. The machine learning system 204 may perform sampling to reduce the computational cost of the fine stage, as processing all of the voxels in the fine grid 512 may be computationally expensive. There are a number of different ways to sample fine grids 512 generated by the occupancy MLP 510. In an aspect, the machine learning system 204 may use a weighted sampling strategy. In a weighted sampling strategy, the probability of a voxel being selected may be proportional to its occupancy prediction. In other words, voxels that are predicted to be occupied by the occupancy MLP 510 may be more likely to be selected than voxels that are predicted to be unoccupied.

FIG. 5B illustrates internal components of the triplane encoder 518. As shown in FIG. 5B, the triplane encoder 518 may have 3 inputs: coarse voxel features 516, fine grids 512 and fine image features 514. The coarse voxel features 516 may be the features extracted from the coarse representation predicted by the coarse stage 502.

Figure 6:
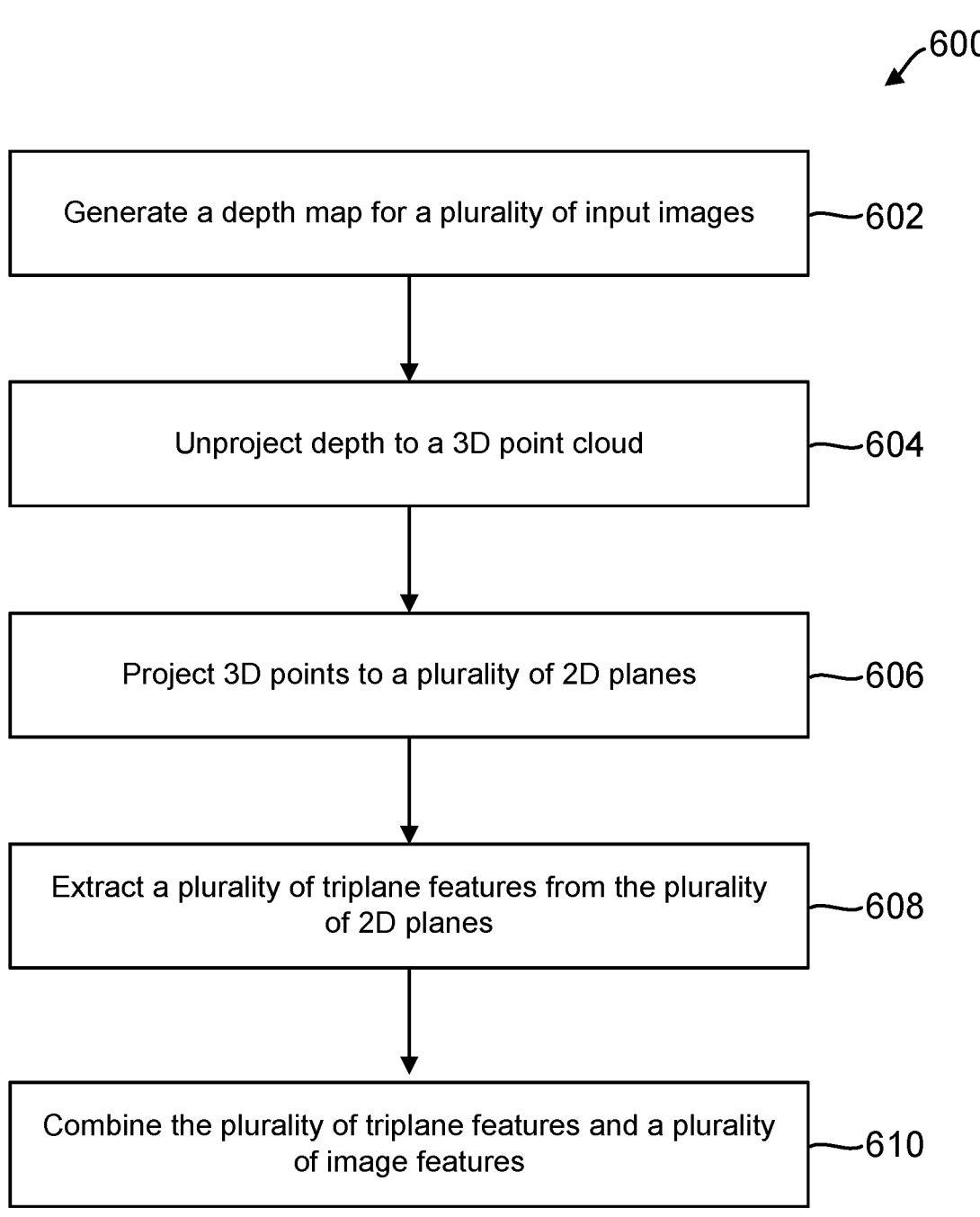
FIG. 6 is a flowchart illustrating an example method for 3D reconstruction using 3D triplane representation in accordance with the techniques of this disclosure.

FIG. 6 is a flowchart illustrating an example method for 3D reconstruction using 3D triplane representation in accordance with the techniques of this disclosure. Although described with respect to computing system 200 (FIG. 2), it should be understood that other devices may be configured to perform a method similar to that of FIG. 6.

In this example, machine learning system 204 may initially use the depth estimation model 206A to generate a depth map (602) for a plurality of input images 210. The depth map is a 2D image that represents the distance of each pixel in the image from the camera. The machine learning system 204 may unproject depth to a 3D point cloud (604). To perform such operation, the machine learning system 204 may utilize at least the following information: the depth map, the camera poses and the intrinsic parameters of the camera. Next, the machine learning system 204 may project 3D points to a plurality of 2D planes to generate a plurality of 2D feature maps (606). In an aspect, the machine learning system 204 may project test positions onto the 3 2D planes using the following equation (1):

$$projected\_position = projection\_matrix @ test\_position \quad (1)$$

where:
projected_position is a 3×1 vector representing the projected position in the 2D plane;
projection_matrix is a 3×3 matrix that represents the projection from 3D to 2D;
test_position is a 3×1 vector representing the test position in 3D. The machine learning system 204 may extract a plurality of triplane features 310 from the corresponding plurality of 2D planes (608). In an aspect, the machine learning system 204 may extract the triplane features 310 from the corresponding 2D plane using the following equation (2):

$$features = triplane\_features[i][:,projected\_position[0], \\ projected\_position[1]] \quad (2)$$

where:
features is a vector of features extracted from the 2D plane;
triplane features is a list of the 3 triplane features;
i is the index of the 2D plane;
projected_position is the projected position in the 2D plane.

In an aspect, the machine learning system 204 may combine the plurality of triplane features and a plurality of image features extracted from the plurality of input images at test positions to generate a single 3D representation of a scene (510).

Figure 7:
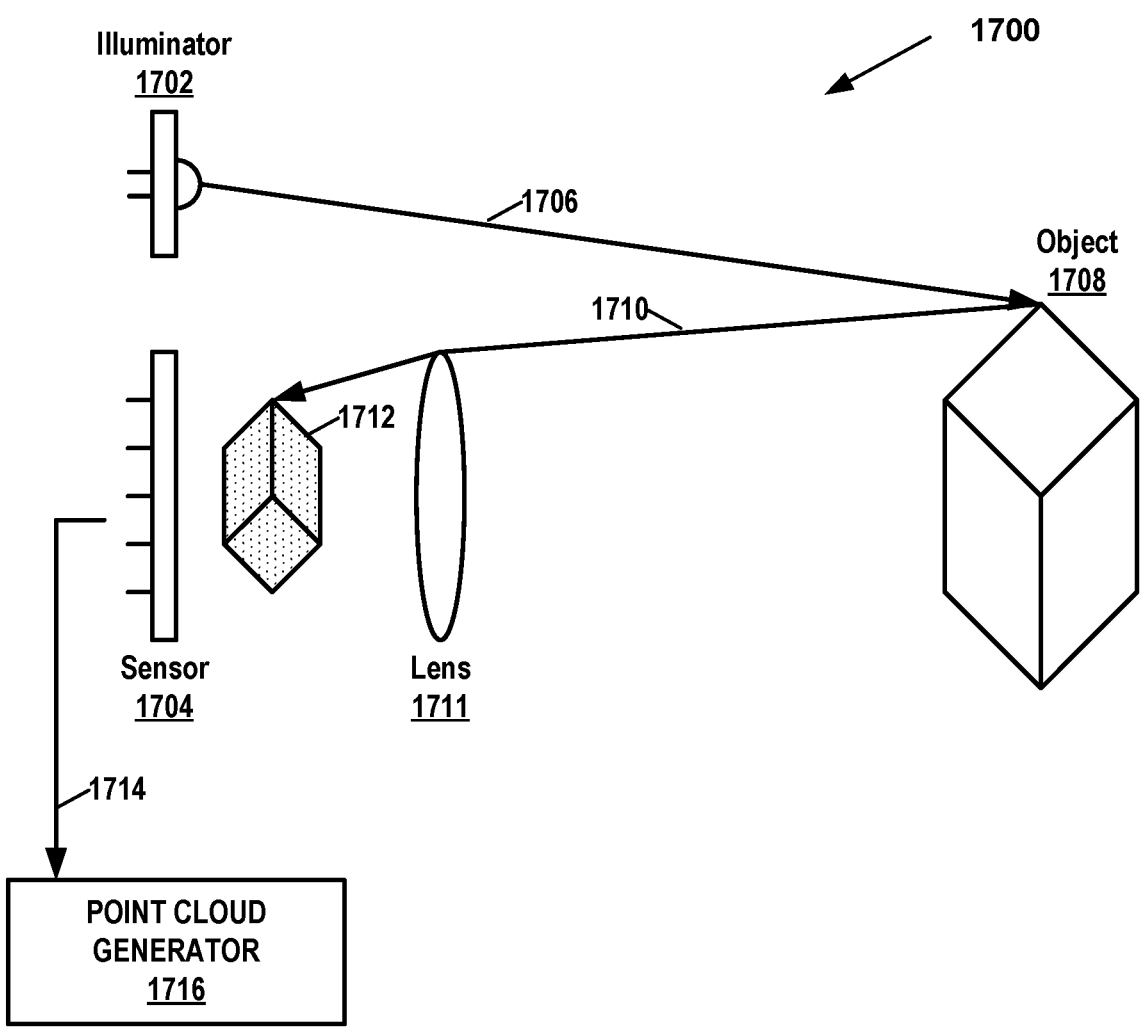
FIG. 7 is a conceptual diagram illustrating an example range-finding system that may be used with one or more techniques of this disclosure.

FIG. 7 is a conceptual diagram illustrating an example range-finding system 1700 that may be used with one or more techniques of this disclosure. In the example of FIG. 7, range-finding system 1700 includes an illuminator 1702 and a sensor 1704. Illuminator 1702 may emit light 1706. In some examples, illuminator 1702 may emit light 1706 as one or more laser beams. Light 1706 may be in one or more wavelengths, such as an infrared wavelength or a visible light wavelength. In other examples, light 1706 is not coherent, laser light. When light 1706 encounters an object, such as object 1708, light 1706 creates returning light 1710. Returning light 1710 may include backscattered and/or reflected light. Returning light 1710 may pass through a lens 1711 that directs returning light 1710 to create an image 1712 of object 1708 on sensor 1704. Sensor 1704 generates signals 1714 based on image 1712. Image 1712 may comprise a set of points (e.g., as represented by dots in image 1712 of FIG. 7).

In some examples, illuminator 1702 and sensor 1704 may be mounted on a spinning structure so that illuminator 1702 and sensor 1704 capture a 360-degree view of an environment (e.g., a spinning LIDAR sensor). In other examples, range-finding system 1700 may include one or more optical components (e.g., mirrors, collimators, diffraction gratings, etc.) that enable illuminator 1702 and sensor 1704 to detect ranges of objects within a specific range (e.g., up to 360-degrees). Although the example of FIG. 7 only shows a single illuminator 1702 and sensor 1704, range-finding system 1700 may include multiple sets of illuminators and sensors.

In some examples, illuminator 1702 generates a structured light pattern. In such examples, range-finding system 1700 may include multiple sensors 1704 upon which respective images of the structured light pattern are formed. Range-finding system 1700 may use disparities between the images of the structured light pattern to determine a distance to an object 1708 from which the structured light pattern backscatters. Structured light-based range-finding systems may have a high level of accuracy (e.g., accuracy in the sub-millimeter range), when object 1708 is relatively close to sensor 1704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1700 is a time of flight (ToF)-based system. In some examples where range-finding system 1700 is a ToF-based system, illuminator 1702 generates pulses of light. In other words, illuminator 1702 may modulate the amplitude of emitted light 1706. In such examples, sensor 1704 detects returning light 1710 from the pulses of light 1706 generated by illuminator 1702. Range-finding system 1700 may then determine a distance to object 1708 from which light 1706 backscatters based on a delay between when light 1706 was emitted and detected and the known speed of light in air). In some examples, rather than (or in addition to) modulating the amplitude of the emitted light 1706, illuminator 1702 may modulate the phase of the emitted light 1706. In such examples, sensor 1704 may detect the phase of returning light 1710 from object 1708 and determine distances to points on object 1708 using the speed of light and based on time differences between when illuminator 1702 generated light 1706 at a specific phase and when sensor 1704 detected returning light 1710 at the specific phase.

In other examples, a point cloud may be generated without using illuminator 1702. For instance, in some examples, sensors 1704 of range-finding system 1700 may include two or more optical cameras. In such examples, range-finding system 1700 may use the optical cameras to capture stereo images of the environment, including object 1708. Range-finding system 1700 may include a point cloud generator 1716 that may calculate the disparities between locations in the stereo images. Range-finding system 1700 may then use the disparities to determine distances to the locations shown in the stereo images. From these distances, point cloud generator 1716 may generate a point cloud.

Sensors 1704 may also detect other attributes of object 1708, such as color and reflectance information. In the example of FIG. 7, a point cloud generator 1716 may generate a point cloud based on signals 1714 generated by sensor 1704. Range-finding system 1700 and/or point cloud generator 1716 may form part of computing device 104 (FIG. 1). Hence, a point cloud generated by range-finding system 1700 may be encoded and/or decoded according to any of the techniques of this disclosure. 3D reconstruction, as described in this disclosure may use point cloud generated by range-finding system 1700.

Figure 8:
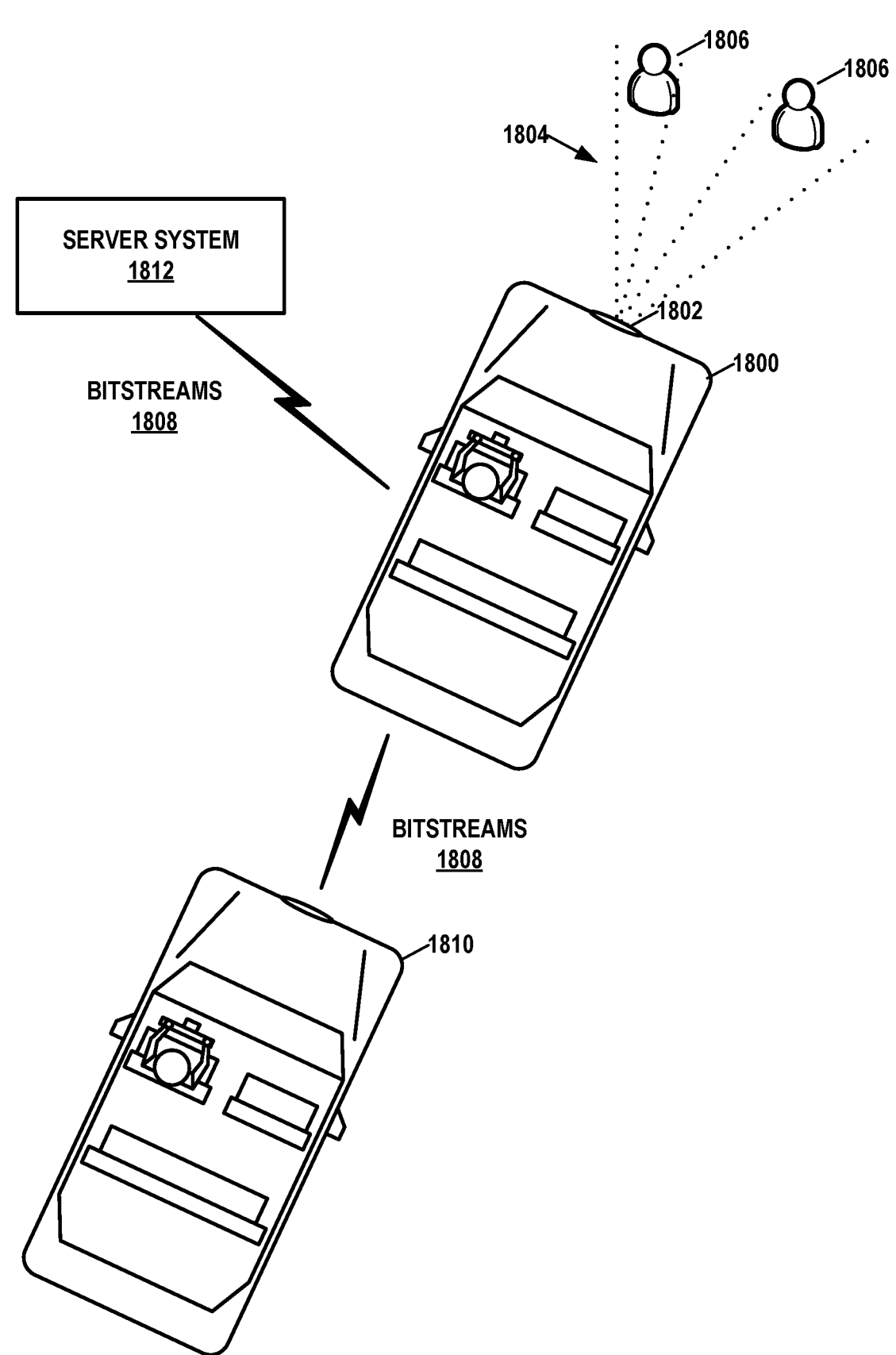
FIG. 8 is a conceptual diagram illustrating an example vehicle-based scenario in which one or more techniques of this disclosure may be used.

FIG. 8 is a conceptual diagram illustrating an example vehicle-based scenario in which one or more techniques of this disclosure may be used. In the example of FIG. 8, a vehicle 1800 includes a range-finding system 1802. Range-finding system 1802 may be implemented in the manner discussed with respect to FIG. 7. Although not shown in the example of FIG. 8, vehicle 1800 may also include a computing device, such as computing device 104 (FIG. 1), and a Geometry Point Cloud Compression (G-PCC) encoder, such as image encoder model 206B (FIG. 2). In the example of FIG. 8, range-finding system 1802 emits laser beams 1804 that reflect off pedestrians 1806 or other objects in a roadway. The data source of vehicle 1800 may generate a point cloud based on signals generated by range-finding system 1802. The G-PCC encoder of vehicle 1800 may encode the point cloud to generate bitstreams 1808. Inter prediction and residual prediction, as described in this disclosure may reduce the size of the geometry bitstream. Bitstreams 1808 may include many fewer bits than the unencoded point cloud obtained by the G-PCC encoder.

An output interface of vehicle 1800 (e.g., data interface 124 (FIG. 1) may transmit bitstreams 1808 to one or more other devices. Bitstreams 1808 may include many fewer bits than the unencoded point cloud obtained by the G-PCC encoder. Thus, vehicle 1800 may be able to transmit bitstreams 1808 to other devices more quickly than the unencoded point cloud data. Additionally, bitstreams 1808 may require less data storage capacity on a device.

In the example of FIG. 8, vehicle 1800 may transmit bitstreams 1808 to another vehicle 1810. Vehicle 1810 may include a G-PCC decoder. The G-PCC decoder of vehicle 1810 may decode bitstreams 1808 to reconstruct the point cloud. Vehicle 1810 may use the reconstructed point cloud for various purposes. For instance, vehicle 1810 may determine based on the reconstructed point cloud that pedestrians 1806 are in the roadway ahead of vehicle 1800 and therefore start slowing down, e.g., even before a driver of vehicle 1810 realizes that pedestrians 1806 are in the roadway. Thus, in some examples, vehicle 1810 may perform an autonomous navigation operation based on the reconstructed point cloud (e.g., via 3D reconstruction).

Additionally or alternatively, vehicle 1800 may transmit bitstreams 1808 to a server system 1812. Server system 1812 may use bitstreams 1808 for various purposes. For example, server system 1812 may store bitstreams 1808 for subsequent reconstruction of the point clouds. In this example, server system 1812 may use the point clouds along with other data (e.g., vehicle telemetry data generated by vehicle 1800) to train an autonomous driving system. In other example, server system 1812 may store bitstreams 1808 for subsequent reconstruction for forensic crash investigations.

Figure 9:
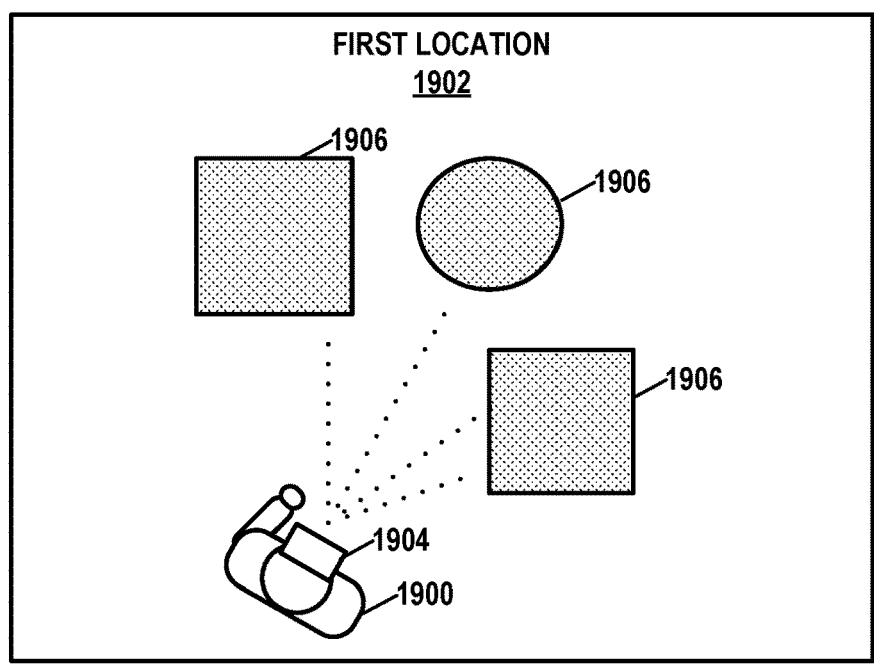
FIG. 9 is a conceptual diagram illustrating an example extended reality system in which one or more techniques of this disclosure may be used.
Figure 9:
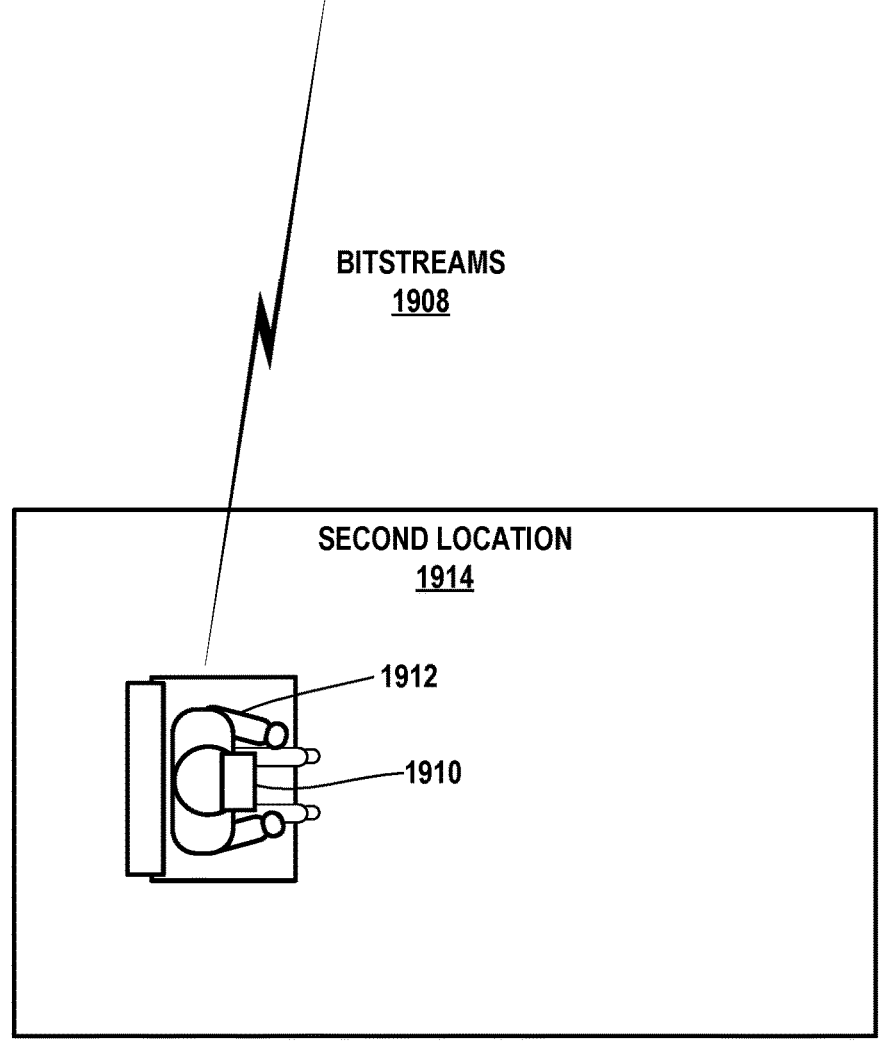

FIG. 9 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 9, a user 1900 is located in a first location 1902. User 1900 wears an XR headset 1904. As an alternative to XR headset 1904, user 1900 may use a mobile device (e.g., mobile phone, tablet computer, etc.). XR headset 1904 includes a depth detection sensor, such as a range-finding system, that detects positions of points on objects 1906 at location 1902. A data source of XR headset 1904 may use the signals generated by the depth detection sensor to generate a point cloud representation of objects 1906 at location 1902. XR headset 1904 may include a G-PCC encoder (e.g., image encoder model 206B of FIG. 2) that is configured to encode the point cloud to generate bitstreams 1908. Inter prediction and residual prediction, as described in this disclosure may reduce the size of bitstream 1908.

XR headset 1904 may transmit bitstreams 1908 (e.g., via a network such as the Internet) to an XR headset 1910 worn by a user 1912 at a second location 1914. XR headset 1910 may decode bitstreams 1908 to reconstruct the point cloud. XR headset 1910 may use the point cloud to generate an XR visualization (e.g., an AR, MR, VR visualization) representing objects 1906 at location 1902. Thus, in some examples, such as when XR headset 1910 generates an VR visualization, user 1912 may have a 3D immersive experience of location 1902. In some examples, XR headset 1910 may determine a position of a virtual object based on the reconstructed point cloud. For instance, XR headset 1910 may determine, based on the reconstructed point cloud, that an environment (e.g., location 1902) includes a flat surface and then determine that a virtual object (e.g., a cartoon character) is to be positioned on the flat surface. XR headset 1910 may generate an XR visualization in which the virtual object is at the determined position. For instance, XR headset 1910 may show the cartoon character sitting on the flat surface.

Figure 10:
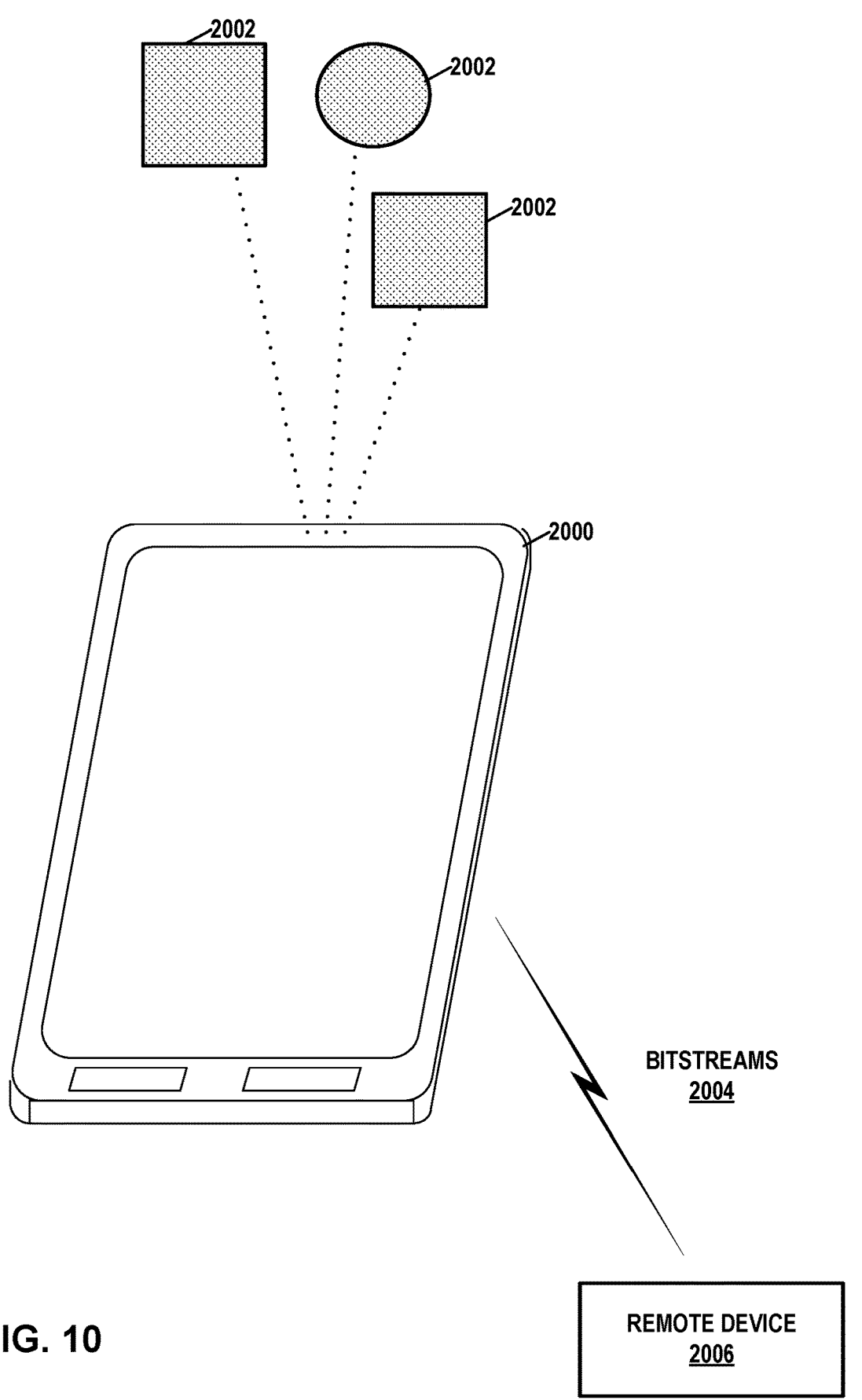
FIG. 10 is a conceptual diagram illustrating an example mobile device system in which one or more techniques of this disclosure may be used.

FIG. 10 is a conceptual diagram illustrating an example mobile device system in which one or more techniques of this disclosure may be used. In the example of FIG. 10, a mobile device 2000 (e.g., a wireless communication device), such as a mobile phone or tablet computer, includes a range-finding system, such as a LIDAR system, that detects positions of points on objects 2002 in an environment of mobile device 2000. A data source of mobile device 2000 may use the signals generated by the depth detection sensor to generate a point cloud representation of objects 2002. Mobile device 2000 may include a G-PCC encoder (e.g., image encoder model 206B of FIG. 2) that is configured to encode the point cloud to generate bitstreams 2004. In the example of FIG. 10, mobile device 2000 may transmit bitstreams to a remote device 2006, such as a server system or other mobile device. 3D reconstruction, as described in this disclosure may utilize bitstreams 2004. Remote device 2006 may decode bitstreams 2004 to reconstruct the point cloud. Remote device 2006 may use the point cloud for various purposes. For example, remote device 2006 may use the point cloud to generate a map of environment of mobile device 2000. For instance, remote device 2006 may generate a map of an interior of a building based on the reconstructed point cloud. In another example, remote device 2006 may generate imagery (e.g., computer graphics) based on the point cloud. For instance, remote device 2006 may use points of the point cloud as vertices of polygons and use color attributes of the points as the basis for shading the polygons. In some examples, remote device 2006 may use the reconstructed point cloud for facial recognition or other security applications.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The following numbered clauses illustrate one or more aspects of the devices and techniques described in this disclosure.

Clause 1. An apparatus for generation of a 3D representation of a scene includes a memory for storing a plurality of images depicting a scene; and processing circuitry in communication with the memory. The processing circuitry is configured to generate a depth map for the plurality of input images depicting a scene and unproject the depth map to a three dimensional (3D) point cloud. The processing circuitry is also configured to project a plurality of 3D points from the 3D point cloud to a plurality of two dimensional (2D) planes and extract a plurality of triplane features from the plurality of 2D planes. The processing circuitry is further configured to generate a 3D representation of the scene based on combining the plurality of triplane features and a plurality of image features extracted from the plurality of input images.

Clause 2. The apparatus of clause 1, wherein the processing circuitry is further configured to: generate a plurality of truncated signed distance function (TSDF) values, prior to generating the 3D representation of the scene; and convert the plurality of TSDF values into a 3D mesh.

Clause 3. The apparatus of clause 1, wherein the processing circuitry is further configured to: sample a bounding box of a predetermined size from the scene using random translation function and rotation function.

Clause 4. The apparatus of clause 1, wherein the processing circuitry configured to project the plurality of 3D points from the 3D point cloud is further configured to project the plurality of 3D points using a point-based learning network model.

Clause 5. The apparatus of clause 4, wherein the point-based learning network model is configured to generate a plurality of 2D feature maps.

Clause 6. The apparatus of clause 5, wherein the processing circuitry configured to extract the plurality of triplane features is further configured to input the plurality of 2D feature maps into a 2D U-Net model having U-Net architecture.

Clause 7. The apparatus of clause 1, wherein the processing circuitry configured to extract the plurality of triplane features is further configured to: determine if a test position does not project to an integer coordinate in a 2D plane of the plurality of 2D planes; and generate, for the test position, a feature based on features from one or more neighboring coordinates of the test position using bilinear interpolation, responsive to determining that the test position does not project to the integer coordinate in the 2D plane.

Clause 8. The apparatus of any of clauses of 1-7, wherein the 3D representation of the scene comprises a 3D mesh.

Clause 9. The apparatus of any of clauses of 1-7, wherein the plurality of input images comprises a plurality of images of the scene taken from different viewpoints.

Clause 10. The apparatus of any of clauses of 1-7, wherein the processing circuitry configured to generate the 3D representation of the scene is further configured to generate a single feature vector comprising the 3D representation of the scene.

Clause 11. The apparatus of any of clauses of 1-7, wherein the plurality of 2D planes comprises six planes.

Clause 12. The apparatus of any of clauses of 1-7, wherein the processing circuitry configured to generate the depth map is further configured to generate the depth map using a deep neural network.

Clause 13. A method comprising: generating a depth map for the plurality of input images depicting a scene; unprojecting the depth map to a 3D point cloud; projecting a plurality of 3D points from the 3D point cloud to a plurality of two dimensional (2D) planes; extracting a plurality of triplane features from the plurality of 2D planes; and generating a 3D representation of the scene based on combining the plurality of triplane features and a plurality of image features extracted from the plurality of input images.

Clause 14. The method of clause 13, further comprising: generating a plurality of truncated signed distance function (TSDF) values, prior to generating the 3D representation of the scene; and converting the plurality of TSDF values into a 3D mesh.

Clause 15. The method of clause 13, further comprising: sampling a bounding box of a predetermined size from the scene using random translation function and rotation function.

Clause 16. The method of clause 13, wherein projecting the plurality of 3D points from the 3D point cloud further comprises projecting the plurality of 3D points using a point-based learning network model.

Clause 17. The method of clause 16, wherein the point-based learning network model is configured to generate a plurality of 2D feature maps.

Clause 18. The method of clause 17, wherein extracting the plurality of triplane features further comprises inputting the plurality of 2D feature maps into a 2D U-Net model having U-Net architecture.

Clause 19. The method of clause 13, wherein extracting the plurality of triplane features further comprises: determining if a test position does not project to an integer coordinate in a 2D plane of the plurality of 2D planes; and generating, for the test position, a feature based on features from one or more neighboring coordinates of the test position using bilinear interpolation, responsive to determining that the test position does not project to the integer coordinate in the 2D plane.

Clause 20. The method of any of clause of 13-19, wherein the 3D representation of the scene comprises a 3D mesh.

Clause 21. The method of any of clauses of 13-19, wherein the plurality of input images comprises a plurality of images of the scene taken from different viewpoints.

Clause 22. The method of any of clauses of 13-19, wherein generating the 3D representation of the scene further comprises generating a single feature vector comprising the 3D representation of the scene.

Clause 23. The method of any of clauses of 13-19, wherein the plurality of 2D planes comprises six planes.

Clause 24. The method of any of clauses of 13-19, wherein generating the depth map further comprises generating the depth map using a deep neural network.

Clause 25. A computer-readable medium storing instructions that, when applied by processing circuitry, causes the processing circuitry to: generate a depth map for the plurality of input images depicting a scene; unproject the depth map to a 3D point cloud; project a plurality of 3D points from the 3D point cloud to a plurality of two dimensional (2D) planes; extract a plurality of triplane features from the plurality of 2D planes; and generate a 3D representation of the scene based on combining the plurality of triplane features and a plurality of image features extracted from the plurality of input images.

Clause 26. A device for generation of a three-dimensional (3D) representation of a scene, the device comprising one or more means for performing steps of: generating a depth map for the plurality of input images depicting a scene; unprojecting the depth map to a 3D point cloud; projecting a plurality of 3D points from the 3D point cloud to a plurality of two dimensional (2D) planes; extracting a plurality of triplane features from the plurality of 2D planes; and generating a 3D representation of the scene based on combining the plurality of triplane features and a plurality of image features extracted from the plurality of input images.

Clause 27. The device of clause 26, wherein the one or more means comprise one or more processors implemented in circuitry.

Clause 28. The device of clause 27, further comprising a memory to store the plurality of input images.

Clause 29. The device of clause 26, further comprising the one or more means for performing steps of: generating a plurality of truncated signed distance function (TSDF) values, prior to generating the 3D representation of the scene; and converting the plurality of TSDF values into a 3D mesh.

Clause 30. The device of claim 26, further comprising the one or more means for performing steps of: sampling a bounding box of a predetermined size from the scene using random translation function and rotation function.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for generation of a three-dimensional (3D) representation of a scene, the apparatus comprising:
   a memory for storing a plurality of input images depicting a scene; and
   processing circuitry in communication with the memory, wherein the processing circuitry is configured to:
   generate a depth map for the plurality of input images depicting a scene;
   unproject the depth map to a 3D point cloud;
   project a plurality of 3D points from the 3D point cloud to a plurality of two dimensional (2D) planes;
   extract a plurality of triplane features from the plurality of 2D planes; and
   generate a 3D representation of the scene based on combining the plurality of triplane features and a plurality of image features extracted from the plurality of input images.

2. The apparatus of claim 1, wherein the processing circuitry is further configured to:
   generate a plurality of truncated signed distance function (TSDF) values, prior to generating the 3D representation of the scene; and
   convert the plurality of TSDF values into a 3D mesh.

3. The apparatus of claim 1, wherein the processing circuitry is further configured to:
   sample a bounding box of a predetermined size from the scene using random translation function and rotation function.

4. The apparatus of claim 1, wherein the processing circuitry configured to project the plurality of 3D points from the 3D point cloud is further configured to project the plurality of 3D points using a point-based learning network model.

5. The apparatus of claim 4, wherein the point-based learning network model is configured to generate a plurality of 2D feature maps.

6. The apparatus of claim 5, wherein the processing circuitry configured to extract the plurality of triplane features is further configured to input the plurality of 2D feature maps into a 2D U-Net model having U-Net architecture.

7. The apparatus of claim 1, wherein the processing circuitry configured to extract the plurality of triplane features is further configured to:
   determine if a test position does not project to an integer coordinate in a 2D plane of the plurality of 2D planes; and
   generate, for the test position, a feature based on features from one or more neighboring coordinates of the test position using bilinear interpolation, responsive to determining that the test position does not project to the integer coordinate in the 2D plane.

8. The apparatus of claim 1, wherein the 3D representation of the scene comprises a 3D mesh.

9. The apparatus of claim 1, wherein the plurality of input images comprises a plurality of images of the scene taken from different viewpoints.

10. The apparatus of claim 1, wherein the processing circuitry configured to generate the 3D representation of the scene is further configured to generate a single feature vector comprising the 3D representation of the scene.

11. The apparatus of claim 1, wherein the plurality of 2D planes comprises six planes.

12. The apparatus of claim 1, wherein the processing circuitry configured to generate the depth map is further configured to generate the depth map using a deep neural network.

13. A method comprising:

generating a depth map for the plurality of input images depicting a scene;

unprojecting the depth map to a 3D point cloud;

projecting a plurality of 3D points from the 3D point cloud to a plurality of two dimensional (2D) planes;

extracting a plurality of triplane features from the plurality of 2D planes; and generating a 3D representation of the scene based on combining the plurality of triplane features and a plurality of image features extracted from the plurality of input images.

14. The method of claim 13, further comprising:

generating a plurality of truncated signed distance function (TSDF) values, prior to generating the 3D representation of the scene; and converting the plurality of TSDF values into a 3D mesh.

15. The method of claim 13, further comprising:

sampling a bounding box of a predetermined size from the scene using random translation function and rotation function.

16. The method of claim 13, wherein projecting the plurality of 3D points from the 3D point cloud further comprises projecting the plurality of 3D points using a point-based learning network model.

17. The method of claim 16, wherein the point-based learning network model is configured to generate a plurality of 2D feature maps.

18. The method of claim 17, wherein extracting the plurality of triplane features further comprises inputting the plurality of 2D feature maps into a 2D U-Net model having U-Net architecture.

19. The method of claim 13, wherein extracting the plurality of triplane features further comprises:

determining if a test position does not project to an integer coordinate in a 2D plane of the plurality of 2D planes; and generating, for the test position, a feature based on features from one or more neighboring coordinates of the test position using bilinear interpolation, responsive to determining that the test position does not project to the integer coordinate in the 2D plane.

20. The method of claim 13, wherein the 3D representation of the scene comprises a 3D mesh.

21. The method of claim 13, wherein the plurality of input images comprises a plurality of images of the scene taken from different viewpoints.

22. The method of claim 13, wherein generating the 3D representation of the scene further comprises generating a single feature vector comprising the 3D representation of the scene.

23. The method of claim 13, wherein the plurality of 2D planes comprises six planes.

24. The method of any of claim 13, wherein generating the depth map further comprises generating the depth map using a deep neural network.

25. A non-transitory computer-readable medium storing instructions that, when applied by processing circuitry, causes the processing circuitry to:

generate a depth map for the plurality of input images depicting a scene;

unproject the depth map to a 3D point cloud;

project a plurality of 3D points from the 3D point cloud to a plurality of two dimensional (2D) planes;

extract a plurality of triplane features from the plurality of 2D planes; and generate a 3D representation of the scene based on combining the plurality of triplane features and a plurality of image features extracted from the plurality of input images.

26. A device for generation of a three-dimensional (3D) representation of a scene, the device comprising one or more means for performing steps of:

generating a depth map for the plurality of input images depicting a scene;

unprojecting the depth map to a 3D point cloud;

projecting a plurality of 3D points from the 3D point cloud to a plurality of two dimensional (2D) planes;

extracting a plurality of triplane features from the plurality of 2D planes; and generating a 3D representation of the scene based on combining the plurality of triplane features and a plurality of image features extracted from the plurality of input images.

27. The device of claim 26, wherein the one or more means comprise one or more processors implemented in circuitry.

28. The device of claim 27, further comprising a memory to store the plurality of input images.

29. The device of claim 26, further comprising the one or more means for performing steps of:

generating a plurality of truncated signed distance function (TSDF) values, prior to generating the 3D representation of the scene; and converting the plurality of TSDF values into a 3D mesh.

30. The device of claim 26, further comprising the one or more means for performing steps of:

sampling a bounding box of a predetermined size from the scene using random translation function and rotation function.

\* \* \* \* \*